(12) United States Patent
Hsieh et al.

(10) Patent No.: US 7,898,210 B2
(45) Date of Patent: Mar. 1, 2011

(54) TO OBTAIN THE THREE-PHASE CURRENT VIA ADJUSTING WIDTH OF PULSES WITH SINGLE DC-LINK CURRENT SENSOR

(75) Inventors: Tung-Chin Hsieh, Hsin-Chu (TW); Kuang-Yao Cheng, Hsin-Chu (TW)

(73) Assignee: Prolific Technology Inc., Nan Kang, Taipei (TW)

( * ) Notice: Subject to any disclaimer, the term of this patent is extended or adjusted under 35 U.S.C. 154(b) by 379 days.

(21) Appl. No.: 12/192,146

(22) Filed: Aug. 15, 2008

(65) Prior Publication Data

US 2009/0212733 A1 Aug. 27, 2009

(30) Foreign Application Priority Data

Feb. 27, 2008 (TW) ............................. 97106787 A

(51) Int. Cl.
*H02P 6/08* (2006.01)
*H02P 7/29* (2006.01)
(52) U.S. Cl. ...................... 318/811; 318/400.3; 318/701; 318/721; 318/729; 318/727
(58) Field of Classification Search ............. 318/400.03, 318/701, 721, 729, 727
See application file for complete search history.

(56) References Cited

U.S. PATENT DOCUMENTS

| 5,309,349 | A | 5/1994 | Kwan |
| 5,552,977 | A * | 9/1996 | Xu et al. ..................... 363/41 |
| 6,642,690 | B2 | 11/2003 | Kim |
| 6,735,537 | B2 | 5/2004 | Liu |
| 7,015,664 | B2 | 3/2006 | Coles et al. |
| 7,075,267 | B1 | 7/2006 | Cheng |
| 7,102,327 | B2 | 9/2006 | Ho |
| 2009/0189553 | A1 * | 7/2009 | Arnet ..................... 318/400.3 |

OTHER PUBLICATIONS

Frede Blaabjerg et al., IEEE Transactions on industry applications, vol. 33, No. 5, p. 1241-1253, "Single current sensor technique in the DC link of three-phase PWM-VS inverters: A review and a novel solution." Sep. 1997.

Hongrae Kim et al., IEEE Transactions on power electronics, vol. 21, No. 5, P1413-1419, "Phase current reconstruction for AC motor drivers using a DC link Single current sensor and measurement voltage vectors" Sep. 2006.

Ying-Yu Tzou et al., IEEE Transactions on power electronics, vol. 12, No. 6, P953-963, "FPGA realization of space-vector PWM control IC for three-phase PWM inverters" Jun. 1997.

* cited by examiner

*Primary Examiner* — Paul Ip
(74) *Attorney, Agent, or Firm* — Winston Hsu; Scott Margo

(57) ABSTRACT

After an AC motor generates a three-phase current, modulate the three-phase current to generate an original voltage space vector, and add three detecting vectors with a sum of zero after the original voltage space vector. While adding the three detecting vectors, sample the current to generate a sampling result. Then adjust the width of pulses generated by a pulse width modulator according to the sampling result.

16 Claims, 29 Drawing Sheets

| Voltage space vector | DC-link current |
|---|---|
| V1(100) | Ia |
| V2(110) | -Ic |
| V3(010) | Ib |
| V4(011) | -Ia |
| V5(001) | Ic |
| V6(101) | -Ib |
| V7(111) | 0 |
| V0(000) | 0 |

FIG. 3 PRIOR ART

TO OBTAIN THE THREE-PHASE CURRENT VIA ADJUSTING WIDTH OF PULSES WITH SINGLE DC-LINK CURRENT SENSOR

BACKGROUND OF THE INVENTION

1. Field of the Invention

The present invention releases a method for adjusting width of pulses through collecting information of a three-phase current, especially a method for adjusting width of pulses through collecting information of a three-phase current by a single DC-link current sensor.

2. Description of the Prior Art

Recently, accompanied with a boom in frequency-conversion technology, AC motors are becoming more and more important in many applications, such as machine tools, automobiles, or domestic frequency-conversion air-conditioners. In a driving system of an AC motor, the core technology of a DC/AC converter is based on pulse width modulation (PWM). Many technologies based on PWM have been developed further, such as sinusoidal pulse width modulation (SPWM), which compares voltages of a three-phase sinusoidal wave with those of a triangular chopped wave, and generates modulations according to the compared results. Due to an easy design and low noises and ripples, the SPWM is commonly applied in AC motor design. However, in a recent couple of years, another technology developed further from PWM, called space vector pulse width modulation (SVPWM), surpasses SPWM in many aspects. SVPWM utilizes the technology of controlling voltages of PWM through tracking a circular revolving magnetic field, and combining voltage space vectors to derive a track of magnetic flux linkage. SVPWM is capable of reducing harmonic waves of output currents, decreasing the power loss caused by harmonic waves in motors, and lowering torque pulses. SVPWM has advantages of low noise, high efficiency in voltage utilization, and being digitalized easily. Compared with SPWM, SVPWM can output more voltages at the same frequency, reduce switching times of transistors, and derive the relationship between a DC-link current and a phase current simply through outputted voltages generated according to the voltage space vectors. Therefore, application of SVPWM instead of SPWM in design of advanced motors is growing gradually.

In a close-loop control process, it's important for a three-phase AC motor to control the current loop properly to increase a bandwidth of the control loop. In the core technology of dominating an AC motor, how to adjust the output voltage of an inverter through a PWM signal, and further manage the current of the AC motor to generate a torque, and simultaneously govern the output torque effectively to get a better revolving efficiency of the AC motor are all based on how to control the current in three phases of the AC motor. Therefore, a driver of a general three-phase AC motor contains at least two phase-current sensors to get feedback current signals for arranging the current control loop. However, the at least two phase-current sensors (for example hall current sensors) increase the cost, volume, weight, and size of the circuitry. Moreover, because these two phase-current sensors only can sense current in two phases, the third phase current should be derived after estimation, and a great possibility of errors will occur in the estimation due to the characteristic differences between external circuitry components and level shifts. Once the errors were transferred to the output torque of the motor, a torque ripple will be produced as a result. Hence, some prior arts utilize a single DC-link current sensor to replace a plurality of phase-current sensors in order to solve this problem. Compared with the hall current sensors, the single DC-link current sensor is low-cost, light, and small, and through it, the wanted currents in three phases can be derived as well.

Methods of deriving currents in three phases from a single DC-link current sensor have been confined to the aforementioned SVPWM so far. However, applying the SPVWM method will face a problem that some voltage space vectors are so short that they are located in the immeasurable region, and are hard to be measured. For solving the problem, U.S. Pat. No. 6,735,537 B2 teaches moving the original voltage space vectors to produce long-enough voltage space vectors for measurement; however, these movements will not change the composite result of original voltage space vectors due to the balance between all the moved space vectors. Yet, this prior art gets disadvantages in a complicated realization way, and a difficulty in choosing timing for sampling current, which ought to be adjusted according to the moved displacement different from each time. Consequently, in this method, the measured phase current is not always the average phase current, and this mismeasurement will play a great influence on the current control of the motor.

Another article published in IEEE transactions on power electronics, Vol. 12, No. 6, November 1997, named "FPGA realization of space-vector PWM control IC for three-phase PWM inverters", written by Ying-Yu Tzou and Hau-Jean Hsu, teaches that in a switching cycle, a zero vector is utilized to adjust the lengths of all the voltage space vectors for eliminating the problem caused by the voltage space vectors located in the immeasurable region. U.S. Pat. No. 7,102,327 B2 takes a further step from this theory to explain that the zero vector is chosen according to the lengths of the two main voltage space vectors. This method not only shrinks the immeasurable region, but also raises a solution of breaking each voltage space vector located in the immeasurable region into two composed vectors to get away from the immeasurable region so as to retrieve information of the three-phase current. However, the disadvantages of this method are complicated when realized, and a repeated counting in timing of sampling current needed in each cycle.

Applying SVPWM with inserting signals to decrease the immeasurable region is what was taught in U.S. Pat. No. 7,075,267 B1. U.S. Pat. No. 7,075,267 B1 indicates inserting a detecting vector in a PWM cycle to determine which phase current should be controlled in this cycle through the DC-link current measured through the detecting vector. Moreover, a hysteresis current controller is contained in circuitry for controlling the sinusoidal currents in three phases. However, this method is recommended to be applied in a system with a high switching frequency, in addition, the hysteresis current controller is an analog device, and not compatible with the digital circuitry of SVPWM. Furthermore, U.S. Pat. No. 7,015,664 B2 teaches to insert voltage space vectors to avoid the problem caused by the voltage space vector located in the immeasurable region. However, this method will influence the length of the composite voltage space vectors generated after combining the voltage space vectors of an SVPWM cycle, and the sampling frequency in a current loop. Another article published in IEEE transactions on power electronics, Vol. 21, No. 5, September 2006, named "Phase current reconstruction for AC motor drives using a DC-link signal current sensor and measurement voltage vectors", written by Hongrae Kim and Thomas M. Jahns, teaches adding three detecting vectors with a sum of zero after the original SVPWM signal in a PWM cycle. This method will not be influenced by the immeasurable region at all when deriving the related information of the phase currents through the DC-link current, and is capable of lowering the switching frequency of PWM;

however, it increases the switching times of transistors, and changes the length of the composite voltage space vector.

Besides, those techniques used in the prior art change the flowing direction of the measured DC-link current, meaning that the voltage on the DC-link current sensor switches between positive and negative values; therefore, the operational amplifier for amplifying the voltage on the DC-link current sensor should be chosen as a dual supply op amp instead of a single supply op amp, which is cheaper. Moreover, the system has to offer dual power sources additionally for the dual supply op amp. Therefore, the system becomes more complicated and costly. Please refer to FIG. 1. FIG. 1 is a schematic diagram of a conventional SVPWM system 200. SVPWM system 200 includes an input power source 3, a DC/AC converter 4, a control chip 8, a three-phase AC motor 5, a DC-link current-sensing resistor 6, a dual supply op amp 90, two voltage regulators 100 and 101, and an A/D converter 7. The DC/AC converter 4 further includes 6 power transistors S1, S2, S3, S4, S5, and S6. The input power source 3 coupled to the DC/AC converter 4 and the DC-link current-sensing resistor 6 is for supplying power to the DC/AC converter 4. The voltage regulator 101 coupled to the control chip 8 and the A/D converter 7 is for supplying power (for example +5V) to the control chip 8 and the A/D converter 7. The voltage regulator 100 coupled to the dual supply op amp 90 is for supplying dual power (for example +/−15V) to the dual supply op amp 90. The dual supply op amp 90 coupled to the DC-link current-sensing resistor 6 is for amplifying the voltage on the DC-link current-sensing resistor 6, and then outputting to the A/D converter 7. The DC-link current-sensing resistor 6 is coupled to the DC/AC converter 4, the current flowing through the DC-link current-sensing resistor 6 is the DC-link current transformed from currents in three phases. The three-phase AC motor 5 coupled to the DC/AC converter 4 is for supplying currents in three phases flowing in/out the DC/AC converter 4. The control chip 8 coupled to the A/D converter 7 and the voltage regulator 101 is for operating control algorithms and processing the feedback current signals. In addition, a majority of documents of the prior art adjust the width of pulses through collecting information of a three-phase current based on the SVPWM method; however, in most low-cost motors, the SPWM method instead of the SVPWM method is commonly applied, hence the techniques taught in a majority of documents of the prior art cannot be put in use in them.

Please refer to FIG. 3. FIG. 3 is a table of corresponding relationship between 8 voltage space vectors including two zero vectors V0(000) and V7(111), and 6 voltage space unit vectors V1(100), V2(110), V3(010), V4(011), V5(001), and V6(101), and the magnitude and direction of currents Ia, Ib, and Ic in three phases a, b, and c flowing through the DC-link current-sensing resistor 6. As shown in FIG. 1, "1" represents the upper arm of the power transistors S1, S3, and S5 being switched on, and the lower arm of the power transistors S2, S4, and S6 being switched off; on the contrary, "0" represents the upper arm of the power transistors S1, S3, and S5 being switched off, and the lower arm of the power transistors S2, S4, and S6 being switched on. For example, voltage space unit vector V1(100) represents the power transistors S1, S4, and S6 in the DC/AC converter 4 being switched on, and the power transistors S2, S3, and S5 being switched off. If the direction of current flowing into the three-phase AC motor 5 is set as positive, then the measured phase current flowing through the DC-link current-sensing resistor 6 is +Ia according to the voltage space unit vector V1(100). Please refer to FIG. 4, which illustrates the flowing direction of current +Ia. FIG. 4 is a diagram of flowing directions of a phase current and a DC-link current when the power transistors S1, S4, and S6 are switched on, and S2, S3, and S5 are switched off.

The 6 voltage space unit vectors V1~V6 are mutually independent, and used as basic vectors in combining voltage space vectors, while the zero vectors V1 and V7 are used for adjusting the duty ratio. Please refer to FIG. 5. FIG. 5 is a diagram of a region of low modulation index in a voltage space vector drawing formed by the 6 voltage space unit vectors V1~V6. In FIG. 5, the region formed by the voltage space vector V1(100) and V2(110) is called the first sextant, the region formed by the voltage space vector V2(110) and V3(010) is called the second sextant, and the rest may be deduced by analogy. Any voltage space vector can be formed by two of the 6 voltage space unit vectors V1~V6 and the zero vector in a proper ratio. The length of each voltage space vector in FIG. 5 represents a period for a power transistor in FIG. 1 being switched-on. For example, V1(100) represents a cycle T in which the power transistors S1, S4, and S6 are switched on, and S2, S3, and S5 are switched off.

If a voltage space vector located between voltage space unit vectors V1 and V2, the optimal switching sequence of this vector is V0, V1, V2, V7, V2, V1, V0 according to the SVPWM theory, therefore, in each cycle, a DC-link current, from which information of phase currents can be collected, is produced theoretically. However in fact, when the voltage space vector is located in the region of low modulation index (the region of slashes in FIG. 5), or located in the edges of active vector regions (the region of slashes in FIG. 7), the voltage space vector itself is too short, in other words, the period for the power transistor being switched-on is so short that the current flowing through the power transistor has not reached a steady state for sampling, then the power transistor is switched off again. Therefore the current flowing through the DC-link current-sensing resistor fails to be sampled in these conditions. FIG. 7 is a diagram of the edges of active vector regions in a voltage space vector drawing formed by the 6 voltage space unit vectors V1~V6. The region of low modulation shown in FIG. 5 and the edges of active vector regions shown in FIG. 7 are jointly called "immeasurable regions". Please refer to FIG. 6. FIG. 6 illustrates a cycle of a voltage space vector located in the region of low modulation (the region of slashes in FIG. 5). In FIG. 6, when "A" signal is "1", it shows that the power transistors S1 is switched on and the power transistor S2 is switched off; when "A" signal is "0", it represents that the power transistors S1 is switched off and the power transistor S2 is switched on; when "B" signal is "1", it shows that the power transistors S3 is switched on and the power transistor S4 is switched off; when "B" signal is "0", it represents that the power transistors S3 is switched off and the power transistor S4 is switched on; when "C" signal is "1", it shows that the power transistors S5 is switched on and the power transistor S6 is switched off; when "C" signal is "0", it represents that the power transistors S5 is switched off and the power transistor S6 is switched on. From FIG. 6, we can see that this voltage space vector is located between voltage space unit vectors V1 and V2, therefore it could follow the optimal switching sequence V0(000), V1(100), V2(110), V7(111), V2(110), V1(100), V0(000) derived from the SVPWM theory. And as aforementioned, the length of the voltage space vector is very short, hence a long period in the cycle of this voltage space vector is full with the zero vector V7(111). Moreover, being located between V1 and V2, this voltage space vector can be composed by V1 and V2 in a certain ratio. In FIG. 6, the vector in time span T1/2 is V1(100), the vector in time span T2/2 is V2(110); we can see time of both these two vectors is very short (it means the lengths of these two vectors are very short), and cannot meet the minimum sampling time span (Tm+Td) for a PWM system. Hence these two vectors lead to a failure in current sampling. Wherein the sampling time span Tm is related to the time period for a transistor from being switched on to a steady state, the op-amp slew rate (inversely proportional to transition time for an op amp to be switched from a low voltage to a high voltage), and the sampling time of an A/D converter; Td is related to the transition time for power transistors of the upper and lower arms being switched-on and cut-off.

Similarly, FIG. 8 illustrates a cycle of a voltage space vector located in the edges of the active vector region (the region of slashes in FIG. 7). In FIG. 8, "A", "B", and "C" signals represent the same meanings as in FIG. 6, therefore the descriptions of them are omitted here for the sake of brevity. The voltage space vector in FIG. 8 is also located between voltage space unit vectors V1 and V2, can be composed by V1 and V2 in a certain ratio, and is suitable for applying the optimal switching sequence V0, V1, V2, V7, V2, V1, V0 according to the SVPWM theory. Because this voltage space vector is located in the edges of active vector region, this vector is composed by a longer voltage space vector V1 (in FIG. 8, V1 represents the vector in the time span T1/2, and T1/2>=Tm+Td), and a short voltage space vector V2 (in FIG. 8, V2 represents the vector in the time span T2/2, and T2/2<=Tm+Td). As a result, only V1 vector can be sampled, V2 fails in the sampling process due to a too short length.

SUMMARY OF THE INVENTION

The present invention releases a method for adjusting a width of pulses through collecting information of a three-phase current, comprising the following steps: an AC motor generates the three-phase current; the three-phase current is modulated to generate an original voltage space vector through a pulse width modulator; voltage composition of the original voltage space vector is detected to generate a detecting result; three detecting vectors with a sum of zero are utilized according to the detecting result; the three detecting vectors with a sum of zero are added after the original voltage space vector; a current is sampled to generate a sampling result while adding the three detecting vectors; and the width of pulses generated by the pulse width modulator is adjusted according to the sampling result.

The present invention releases a pulse-width modulation system adjusting a width of pulses through collecting information of a three-phase current, comprising a three-phase AC motor, a pulse-width modulator, a detecting device, a detecting vector generator, a control chip, and an A/D converter. The three-phase AC motor is for generating a three-phase current. The pulse-width modulator coupled to the three-phase AC motor is for modulating the three-phase currents to generate an original voltage space vector. The detecting device is for detecting voltage composition of the original voltage space vector. The detecting vector generator is for offering three detecting vectors with a sum of zero according to the detecting result. The control chip coupled to the pulse-width modulator is for adding the three detecting vectors with a sum of zero after the original voltage space vector. The A/D converter coupled to the control chip is for sampling a current to generate a sampling result while adding the three detecting vectors. Wherein the control chip adjusts the width of pulses generated by the pulse width modulator according to the sampling result.

The present invention further releases a method for adjusting a width of pulses through collecting information of a three-phase current, comprising the following steps: an AC motor generates the three-phase current; the three-phase current is modulated to generate a first sequence of voltage space vectors through a pulse-width modulator, the first sequence of voltage space vectors comprising a plurality of first voltage space vectors; each first voltage space vector in the first sequence of voltage space vectors is detected to generate a first detecting result; voltage composition of a sum of the plurality of first voltage space vectors is detected to generate a second detecting result; different zero voltage space vectors in the first sequence of voltage space vectors are replaced with a same zero voltage space vector chosen from the first sequence of voltage space vectors to generate a second sequence of voltage space vectors according to the first detecting result, the second sequence of voltage space vectors comprising a plurality of second voltage space vectors; orders of the second voltage space vectors in the second sequence of voltage space vectors are rearranged to generate a third sequence of voltage space vectors; three detecting vectors with a sum of zero are offered according to the second detecting result; the three detecting vectors with a sum of zero are added after the third sequence of voltage space vectors orderly; a current is sampled to generate a sampling result while adding the three detecting vectors; and the width of pulses generated by the pulse width modulator is adjusted according to the sampling result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a table of corresponding relationship between voltage space vectors V0~V7 and the magnitude and direction of currents Ia, Ib, and Ic in three phases a, b, and c flowing through the DC-link current-sensing resistor.

DETAILED DESCRIPTION

The present invention raises a method for adjusting a width of pulses through collecting information of a three-phase current to overcome disadvantages in the prior art. According to the electrical characteristics of the motors, the present invention adds specific detecting vectors to make the voltage on a DC-link current-sensing resistor a positive value, amplifies and filters the voltage through a single supply op amp, and then utilizes the synchronous sampling technology of PWM to sample voltage signals, subsequently transfers the sampled voltage signals to an A/D converter to retrieve the information of currents in three phases. The present invention will not be affected by the immeasurable region, and has advantages of a simple practical method, a fixed time point of sampling currents, and deriving an average current. The present invention is not only suitable for application in an SVPWM system, but also in an SPWM system.

Figure 2:
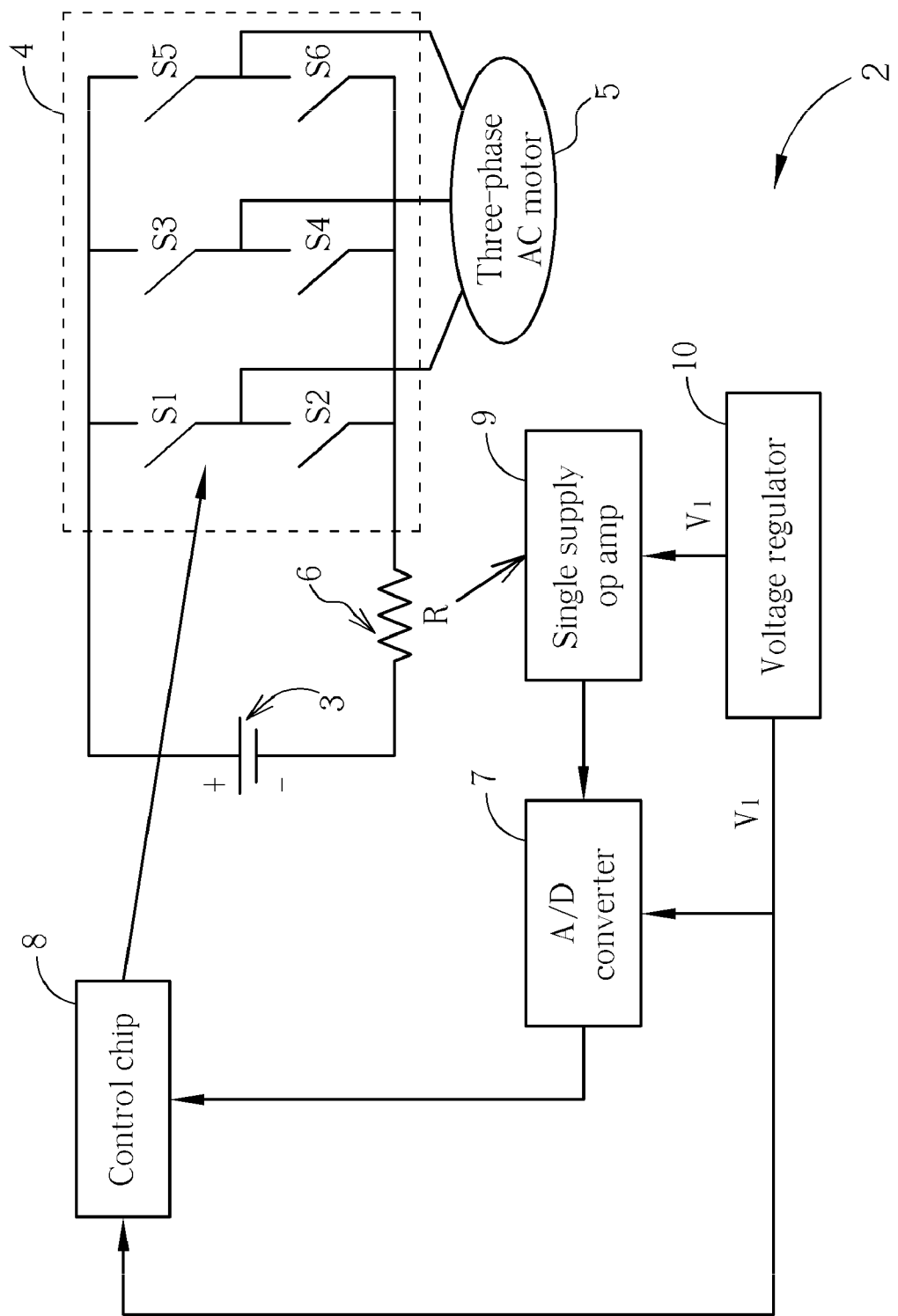
FIG. 2 is a schematic diagram of an SVPWM system according to the present invention.
Figure 4:
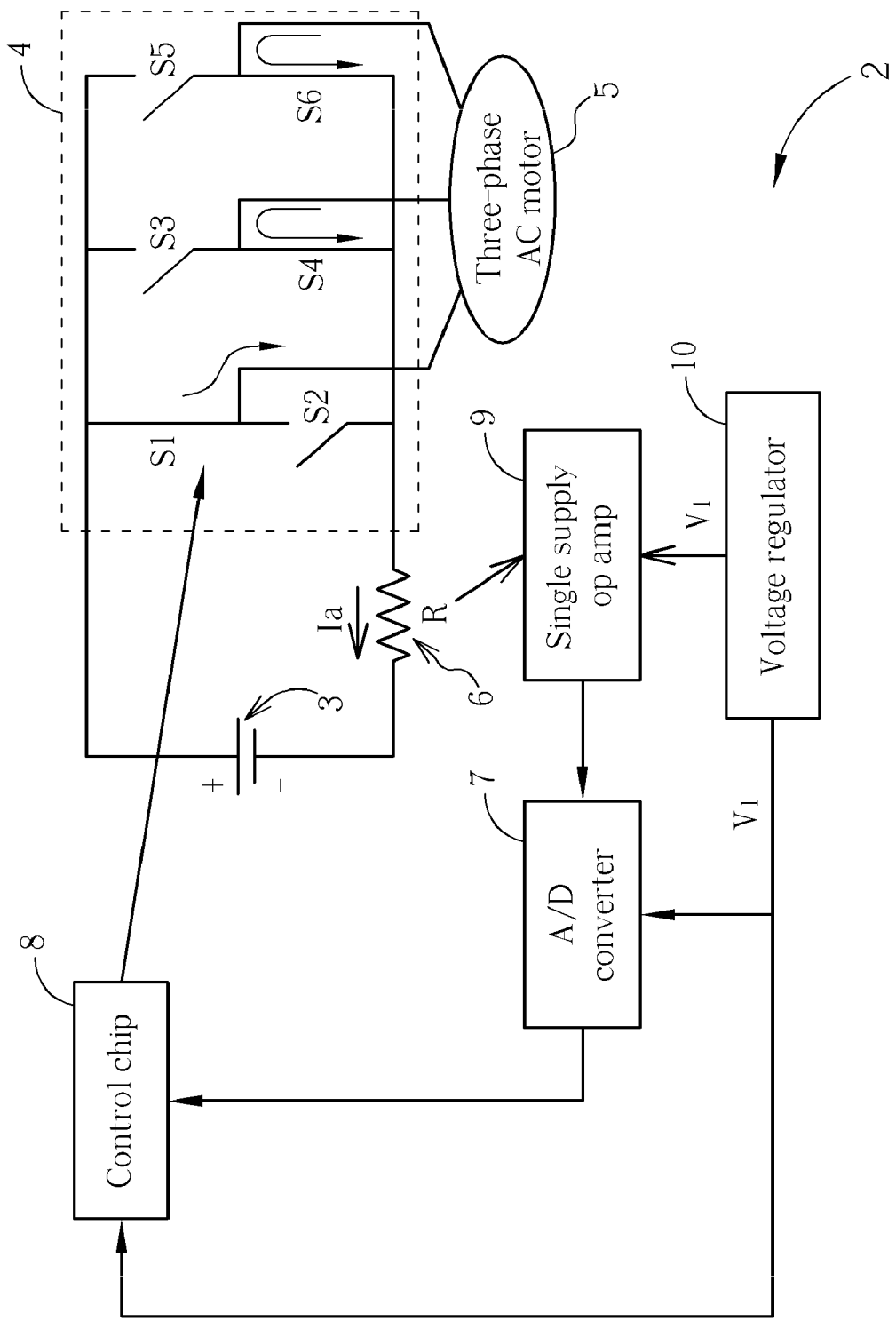
FIG. 4 is a diagram of flowing directions of a phase current and a DC-link current when the power transistors S1, S4, and S6 are switched on, and S2, S3, and S5 are switched off.

Please refer to FIG. 2. FIG. 2 is a schematic diagram of an SVPWM system 2 according to the present invention. SVPWM 2 includes an input power source 3, a DC/AC converter 4, a control chip 8, a three-phase AC motor 5, a DC-link current-sensing resistor 6, a single supply op amp 9, a voltage regulator 10, and an A/D converter 7. The input power source 3 coupled to the DC/AC converter 4, and the DC-link current-sensing resistor 6 is for supplying power to the DC/AC converter 4. The voltage regulator 10 coupled to the control chip 8, the A/D converter 7, and the single supply op amp 9 is for supplying power (for example +5V) to the control chip 8, the A/D converter 7, and the single supply op amp 9 simultaneously. The single supply op amp 9 coupled to the DC-link current-sensing resistor 6 is for amplifying the voltage on the DC-link current-sensing resistor 6, and then outputting to the A/D converter 7. The DC-link current-sensing resistor 6 is coupled to the DC/AC converter 4, the current flowing through the DC-link current-sensing resistor 6 is the DC-link current transformed from currents in three phases. The three-phase AC motor 5 coupled to the DC/AC converter 4 is for supplying currents in three phases flowing in/out the DC/AC converter 4. The control chip 8 coupled to the A/D converter 7 and the voltage regulator 10 detects voltage composition of the original voltage space vector to generate a detecting result, offers a set of three detecting vectors with a sum of zero according to the detecting result, and adds the three detecting vectors with a sum of zero after the original voltage space vector orderly through the software/firmware written in the control chip 8; then operates the control algorithms to process the feedback current signals, and adjusts the width of pulses through collecting information of the three-phase currents. The DC/AC converter 4 is used as a pulse-width modulator, and further includes 6 power transistors S1, S2, S3, S4, S5, and S6. Depending on different combinations of on and off states of these 6 transistors, 8 voltage space vectors are formed, 2 zero vectors and 6 voltage space vectors, for determining the magnitude and direction of phase-currents flowing through the DC-link current-sensing resistor 6. The A/D converter 7 is for converting the DC-link current signals measured on the DC-link current-sensing resistor 6 into digital signals, and then transferring to the control chip 8, and allocating the motor's control to generate feedback PWM signals to the DC/AC converter 4.

Figure 5:
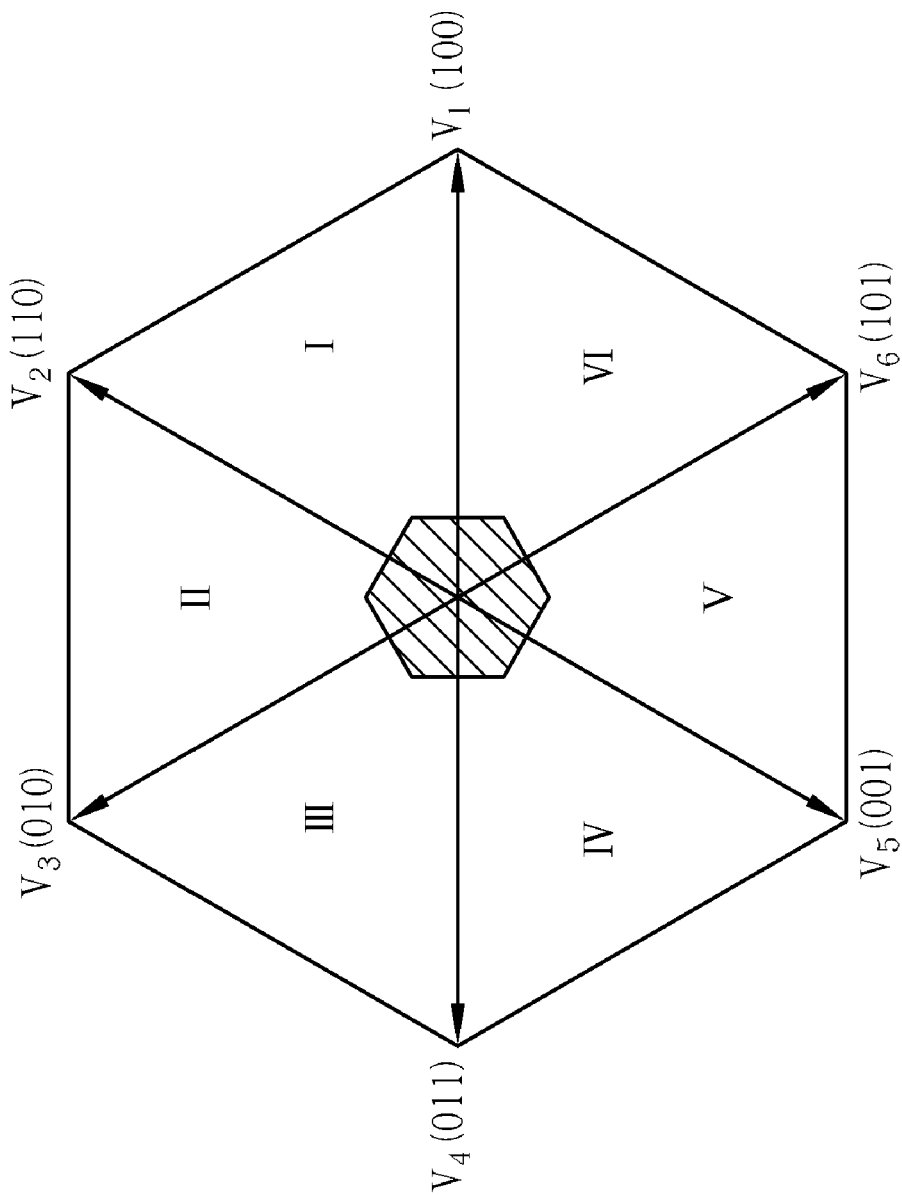
FIG. 5 is a diagram of a region of low modulation in a voltage space vector drawing formed by the voltage space unit vectors V1~V6.

In order to evade the failure in sampling currents in the immeasurable region, the present invention adds two sets of 3 detecting vectors with a sum of zero, and of directions in (100), (010), (001) or (011), (101), (110) respectively, in order to increase the length of the original voltage space vector to at least (Tm+Td). If two phase voltages in the original voltage space vector are positive, a set of detecting vectors of directions in (100), (010), (001) respectively is added; wherein the detecting vector of a direction in (100) detects the current in phase a of three phases a, b, c, the detecting vector of a direction in (010) detects the current in phase b, and the detecting vector of a direction in (001) detects the current in phase c. If two phase voltages in the original voltage space vector are negative, another set of voltage space vectors of directions in (011), (101), (110) respectively is added; wherein the detecting vector of a direction in (011) detects the current in phase a of three phases a, b, c, the detecting vector of a direction in (101) detects the current in phase b, and the detecting vector of a direction in (110) detects the current in phase c. Please refer to FIG. 11, which is a diagram of regions for adding different sets of detecting vectors in a voltage space vector drawing formed by the voltage space unit vectors V1~V6. In FIG. 11, each sextant in FIG. 5 is divided into 2 regions: region 1 and region 2; wherein the region 1 is for adding the set of detecting vectors of directions in (011), (101), (110) respectively, and the region 2 is for adding the other set of detecting vectors of directions in (100), (010), (001) respectively. Please refer to FIG. 9, which is a diagram of adding 3 detecting vectors after an original voltage space vector Vs1 according to the method provided by the present invention. From FIG. 9, we can see the original voltage space vector Vs1 is located in the region 1 of the $6^{th}$ sextant in FIG. 5, therefore the set of detecting vectors of directions in (011), (101), (110) respectively is added after the Vs1. Please refer to FIG. 10, which is a diagram of adding 3 detecting vectors after an original voltage space vector Vs2 according to the method provided by the present invention. From FIG. 10, we can see the original voltage space vector Vs2 is located in the region 2 of the $2^{nd}$ sextant in FIG. 5, therefore the other set of detecting vectors of directions in (100), (010), (001) respectively is added after the Vs2.

Figure 1:
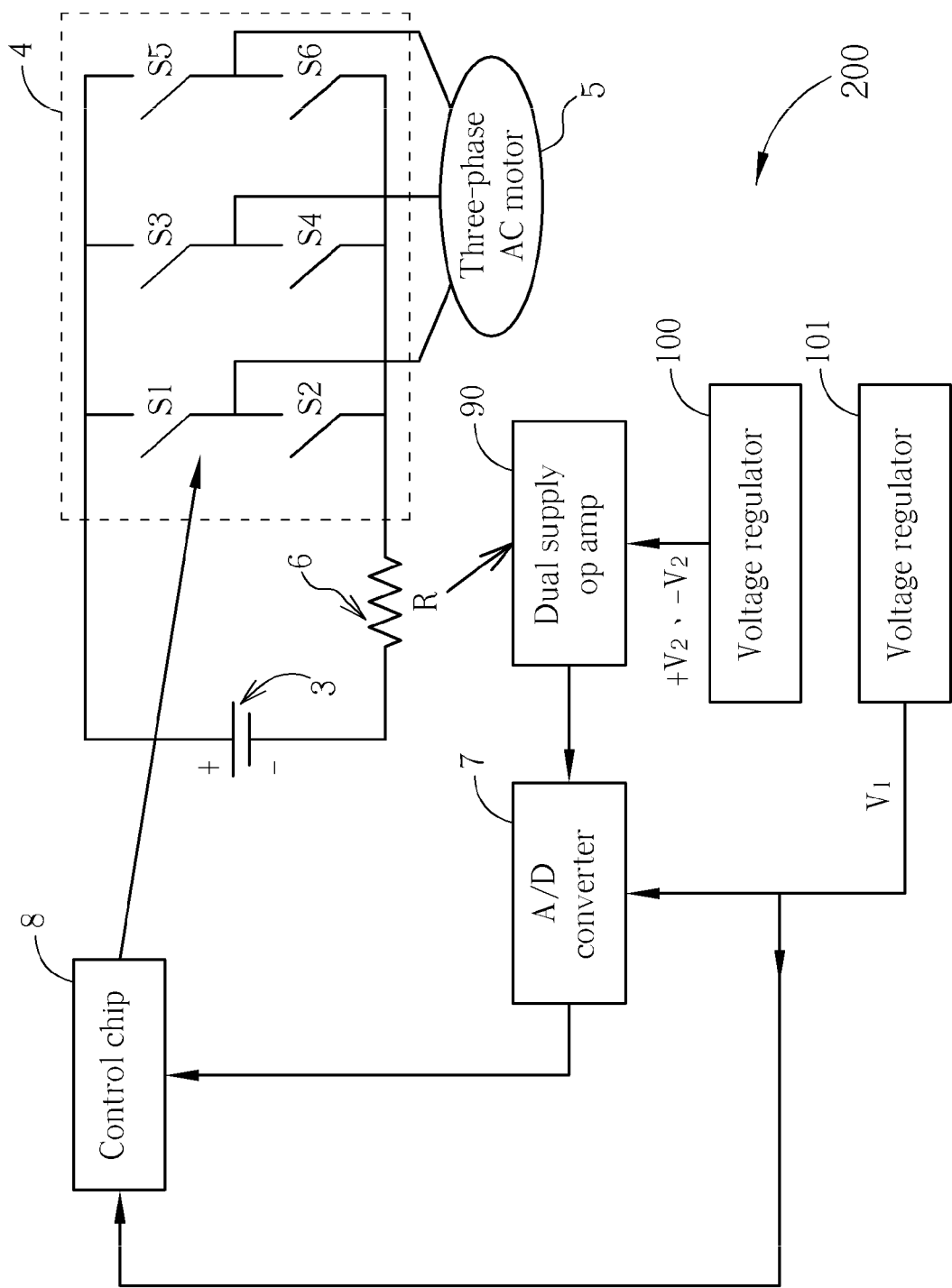
FIG. 1 is a schematic diagram of a conventional SVPWM system.
Figure 6:
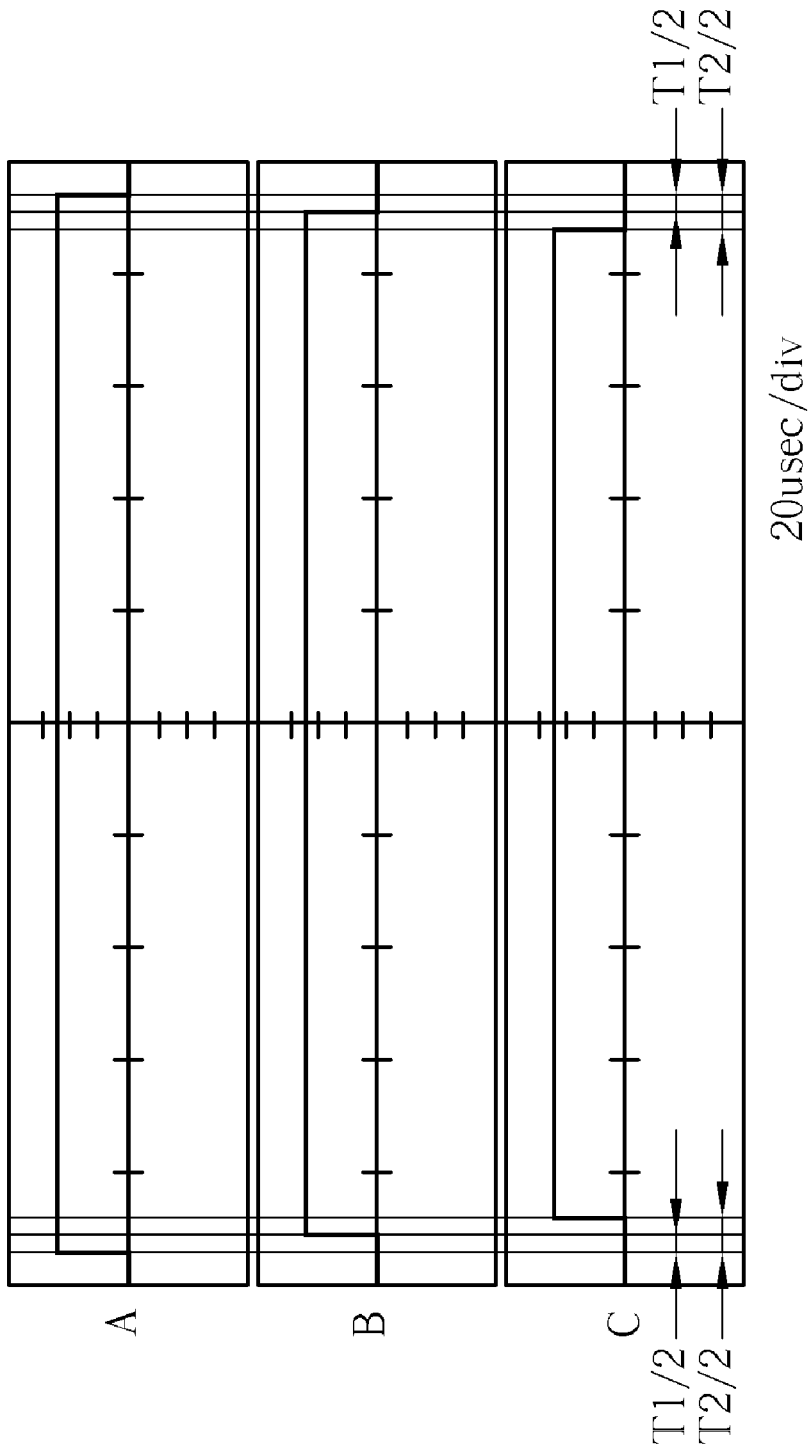
FIG. 6 illustrates a cycle of a voltage space vector located in the region of low modulation (the region of slashes in FIG. 5).
Figure 7:
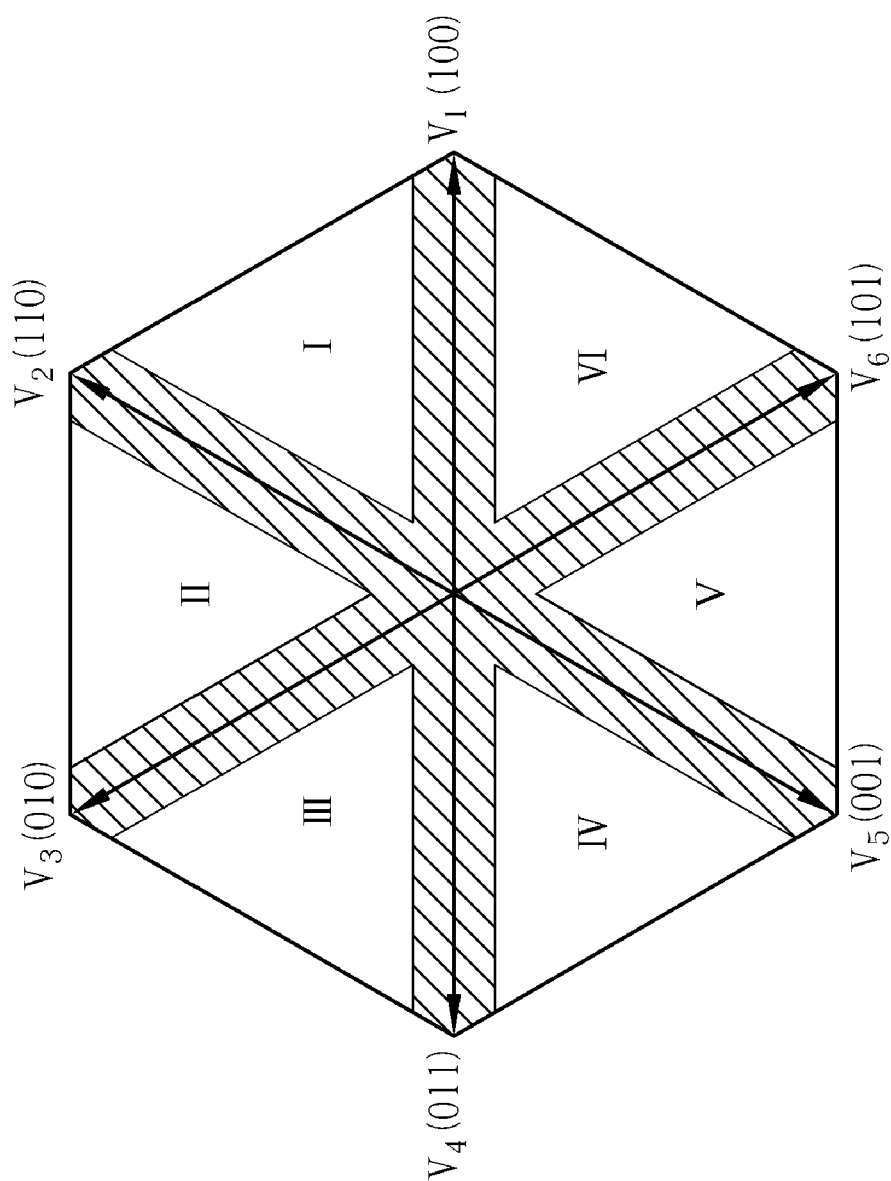
FIG. 7 is a diagram of the edges of active vector regions in a voltage space vector drawing formed by the voltage space unit vectors V1~V6.
Figure 8:
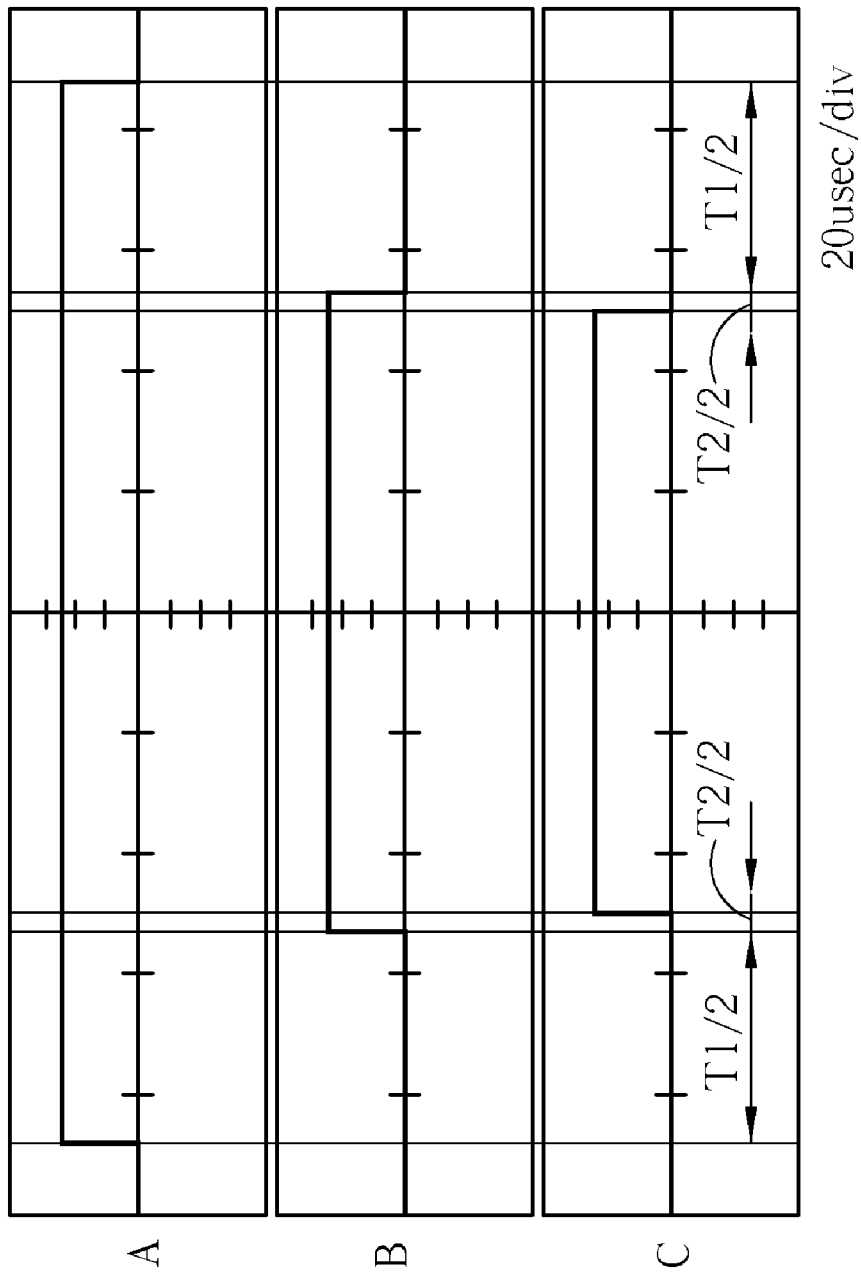
FIG. 8 illustrates a cycle of a voltage space vector located in the edges of the active vector region (the region of slashes in FIG. 7).
Figure 9:
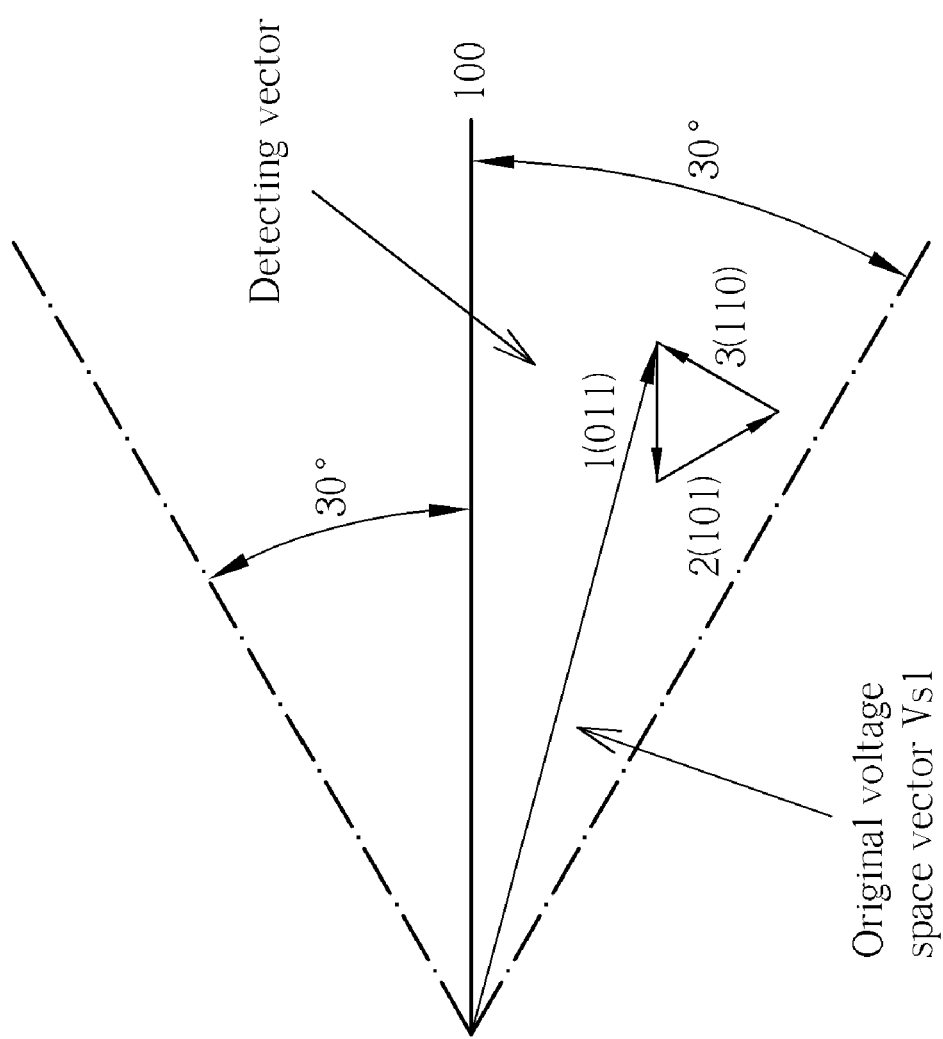
FIG. 9 is a diagram of adding 3 detecting vectors after an original voltage space vector according to the method provided by the present invention.
Figure 12:
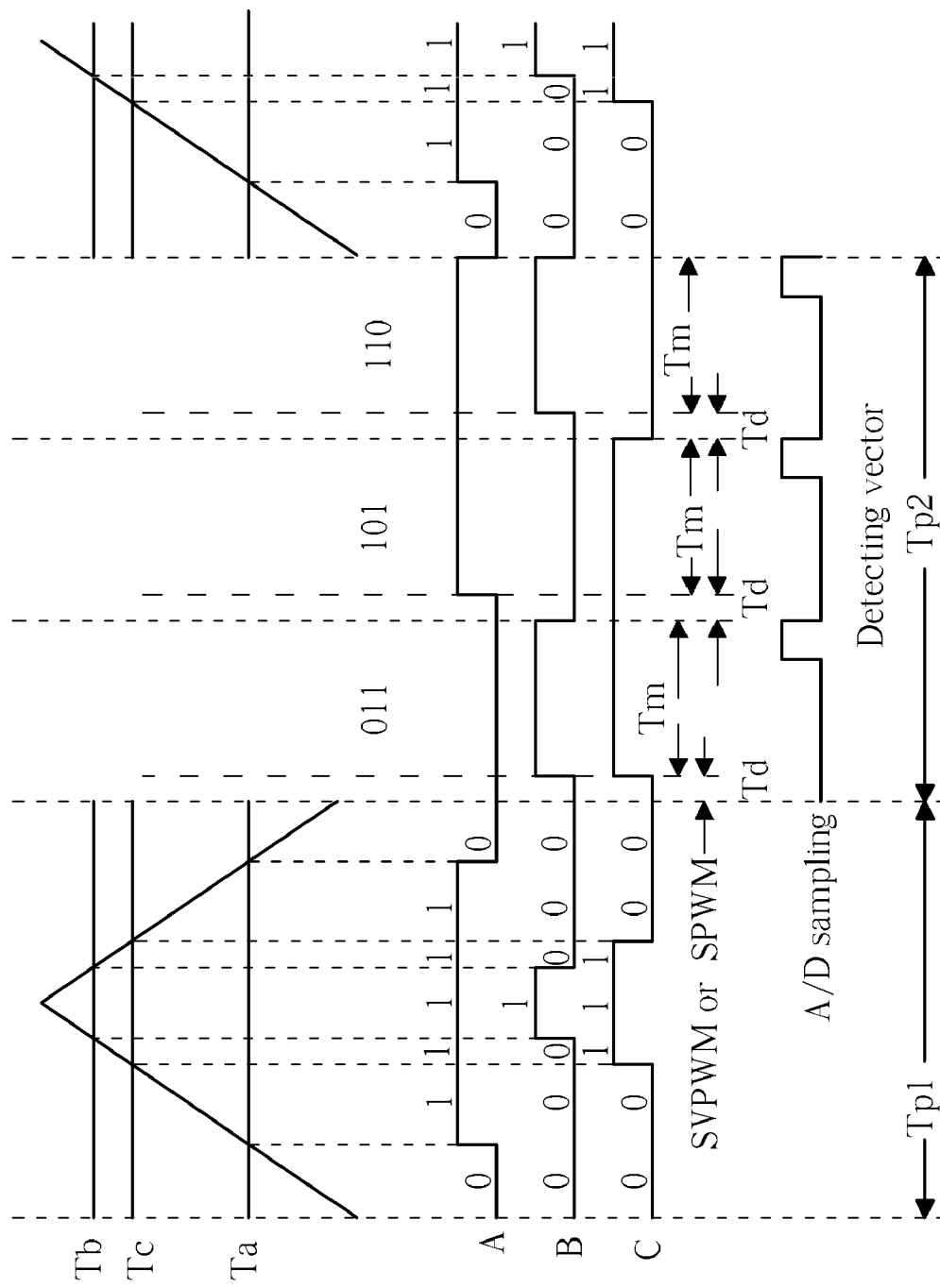
FIG. 12 is a timing diagram of FIG. 9.

FIG. 12 is a timing diagram of FIG. 9. In FIG. 12, the first-half time span Tp1 represents the modulation time of the original voltage space vector Vs1, the second-half time span Tp2 represents the entire time for adding the set of the 3 detecting vectors of directions in (011), (101), and (110) respectively. As aforementioned, the length of each voltage space vector in a voltage space vector drawing formed by the voltage space unit vectors V1~V6 not merely represents a period for a power transistor in FIG. 1 being switched-on, but the lasting time span of the three-phase currents corresponding to this voltage space vector. In FIG. 12, the "A", "B", and "C" signals represent the same meanings as in FIG. 6, therefore the descriptions of them are omitted here for brevity. The triangle wave in the upper part in the first-half time span Tp1 of FIG. 12 is a ratio of carrier waves generated according to SVPWM theory. If the ratio of carrier waves is higher than Ta, it represents "A" signal is "1" and lower than Ta represents "A" signal is "0". For the same reason, if the ratio of carrier waves is higher than Tb, it represents "B" signal is "1" while lower than Tb represents "B" signal is "0". So is the relationship between Tc and "C" signal. Because from FIG. 9 we can see the original voltage space vector Vs1 is located in the region 1 of the $6^{th}$ sextant in FIG. 5, therefore it can be combined by two voltage space unit vectors V1 (100) and V6(101); and moreover, the optimal switching sequence according to the SVPWM theory for Vs1 is V0, V1, V6, V7, V6, V1, V0 cohering with the voltage space vector sequence shown in time span Tp1 of FIG. 12. And in the following time span Tp2, a set of the 3 detecting vectors of directions in (011), (101), (110) respectively is added to increase the sampling time of the A/D converter to at least (Tm+Td) for a complete sampling process. In FIG. 12, these above-mentioned results can be seen as well.

In FIG. 12, the sampling time of an A/D converter is also illustrated for reference. From FIG. 12, we can see that the sampling time of the A/D converter is included in Time span Tm (as aforementioned), and the lengths of the 3 detecting vectors are all longer than the sampling time of the A/D converter, therefore the sampling process can be finished completely. Due to a fixed length of these 3 detecting vectors (at least (Tm+Td)), the sampling point can be fixed correspondingly and does not have to be changed according to the switching time point of the PWM system as the conventional technology does, therefore the average current is derived easily, and the currents in three phases are generated more precisely as a result.

Figure 10:
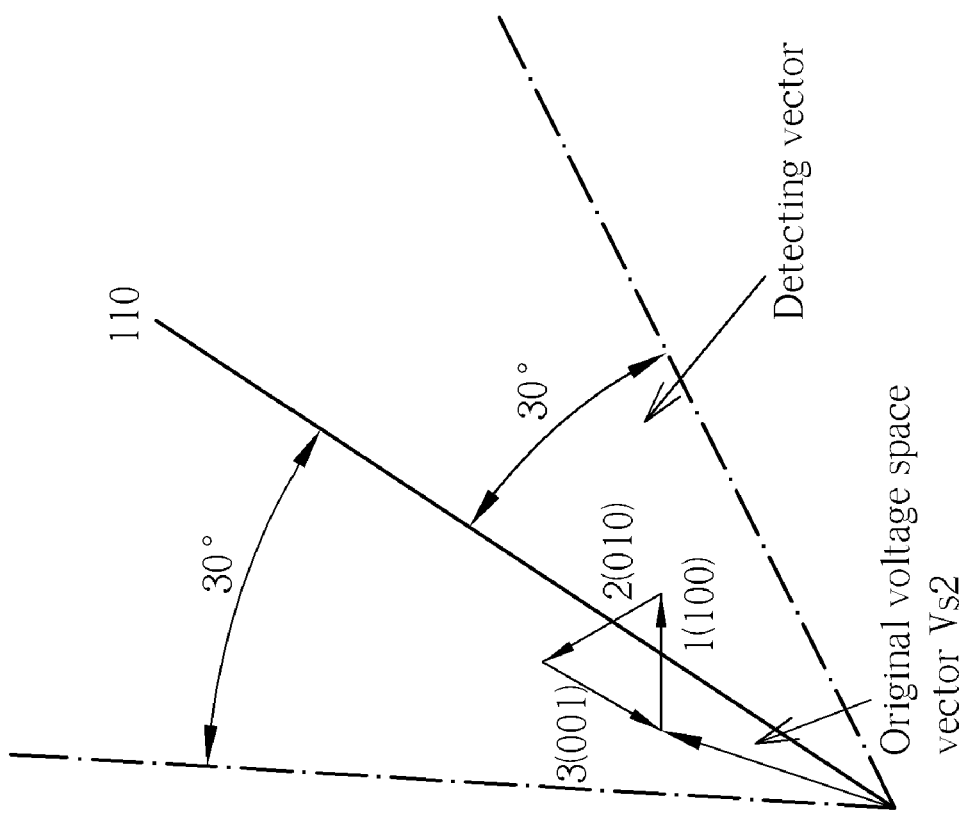
FIG. 10 is another diagram of adding 3 detecting vectors after an original voltage space vector according to the method provided by the present invention.
Figure 11:
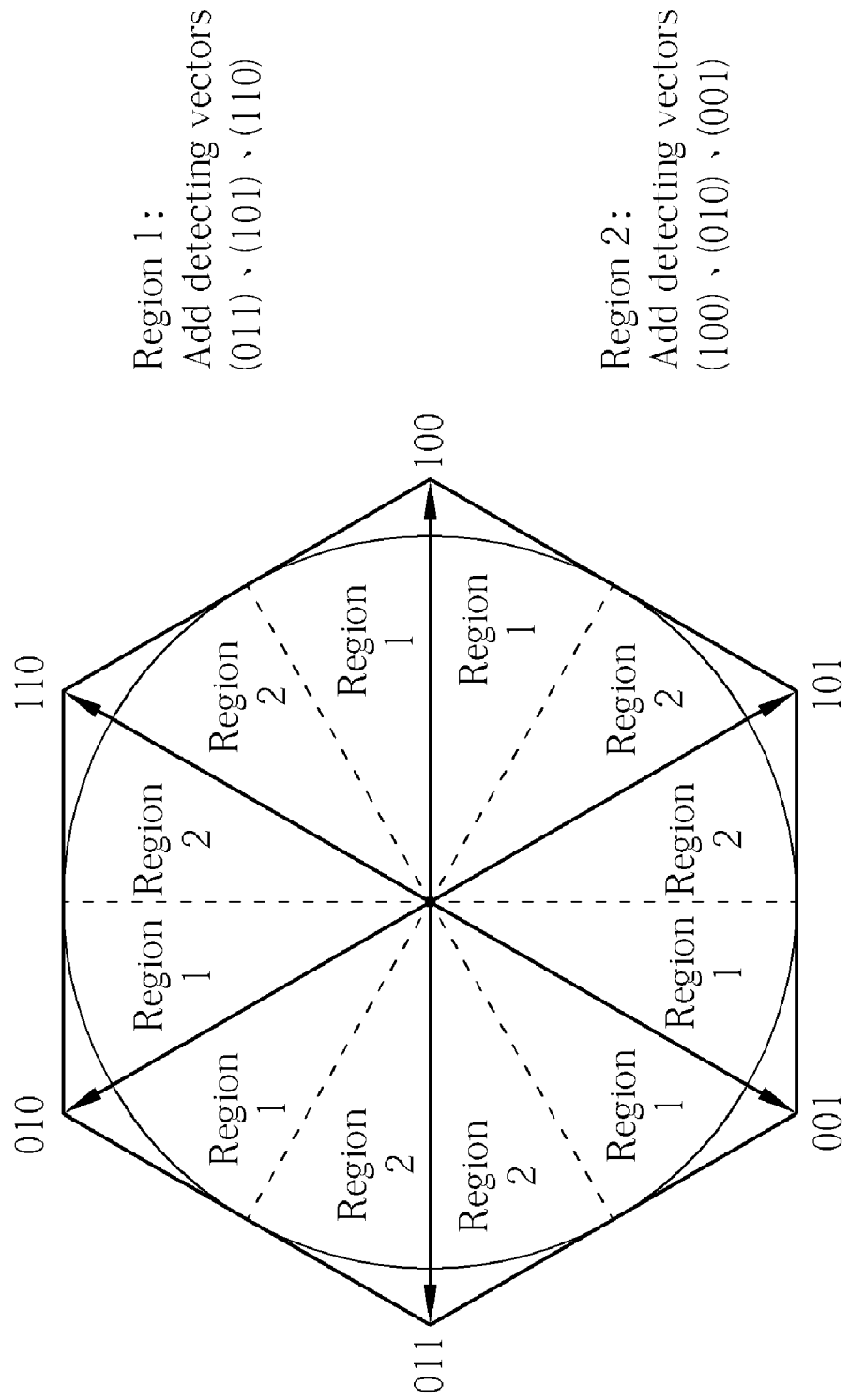
FIG. 11 is a diagram of regions for adding different sets of detecting vectors in a voltage space vector drawing formed by the voltage space unit vectors V1~V6.
Figure 13:
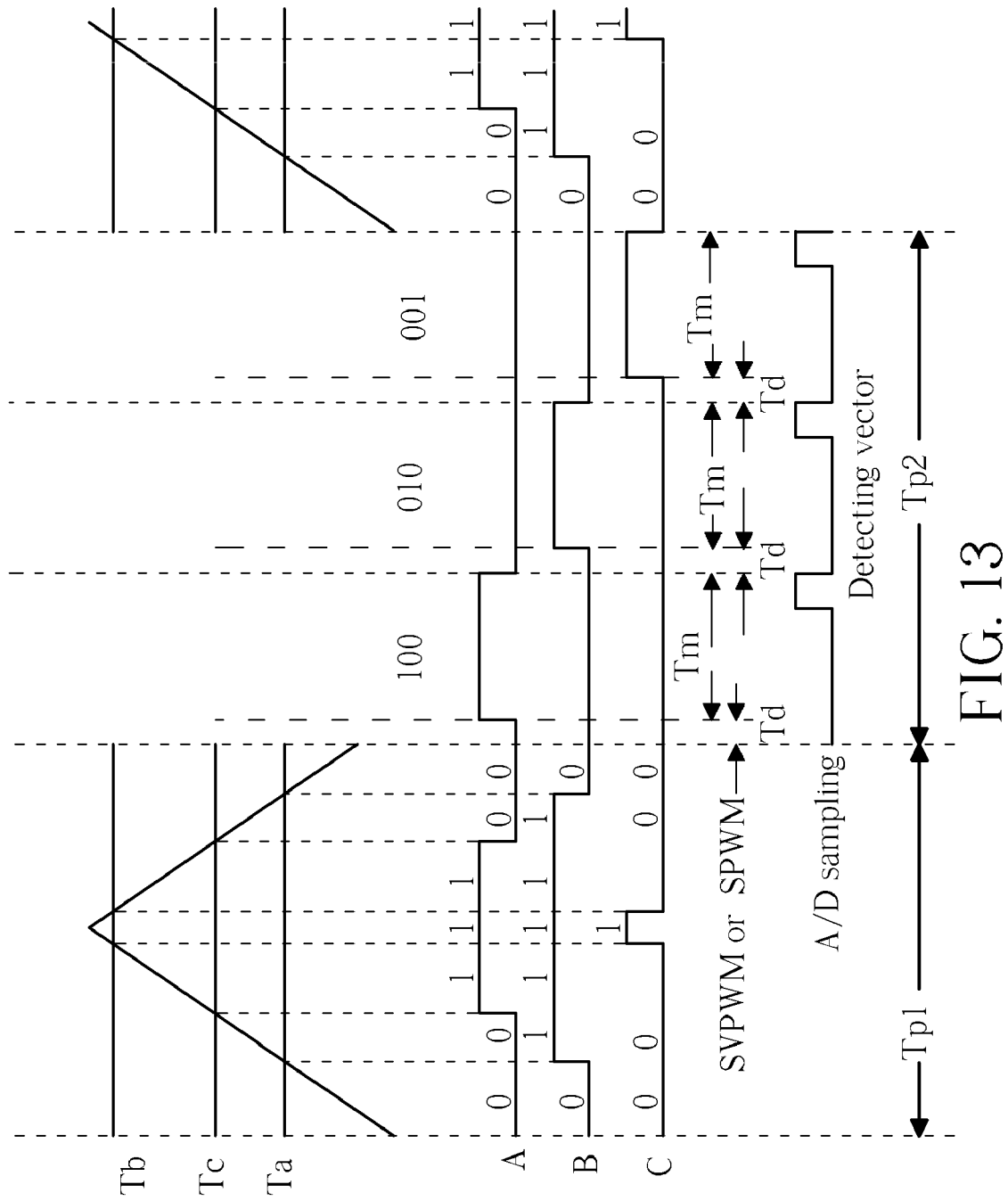
FIG. 13 is a timing diagram of FIG. 10.

For the same reason, FIG. 13 is a timing diagram of FIG. 10. In FIG. 13, the first-half time span Tp1 represents the modulation time of the original voltage space vector Vs2, the second-half time span Tp2 represents the total time for adding another set of the 3 detecting vectors of directions in (100), (010), and (001) respectively. In FIG. 13, the "A", "B", and "C" signals represent the same meanings as in FIG. 6, therefore the descriptions of them are omitted here for brevity. The triangle wave in the upper part in the first-half time span Tp1 of FIG. 13 is a ratio of carrier waves generated according to SVPWM, the same as in FIG. 12. Because from FIG. 10, we can see the original voltage space vector Vs2 is located in the region 2 of the $2^{nd}$ sextant in FIG. 5, therefore it can be combined by two voltage space unit vectors V2(110) and V3(010); and moreover, the optimal switching sequence according to the SVPWM theory for Vs2 is V0, V3, V2, V7, V2, V3, V0 cohering with the voltage space vector sequence shown in time span Tp1 of FIG. 13. And in the following time span Tp2, another set of 3 detecting vectors of directions in (100), (010), (001) respectively is added to increase the sampling time of the A/D converter to at least (Tm+Td) for a complete sampling process. In FIG. 13, these results can be seen as well. In FIG. 13, the sampling time of the A/D converter is also illustrated for reference. From FIG. 13, we can see that the lengths of the 3 detecting vectors are fixed and longer than the sampling time of the A/D converter, the sampling point is fixed correspondingly, and the average current is derived easily; therefore the correct currents in three phases could be generated as a result.

Figure 14:
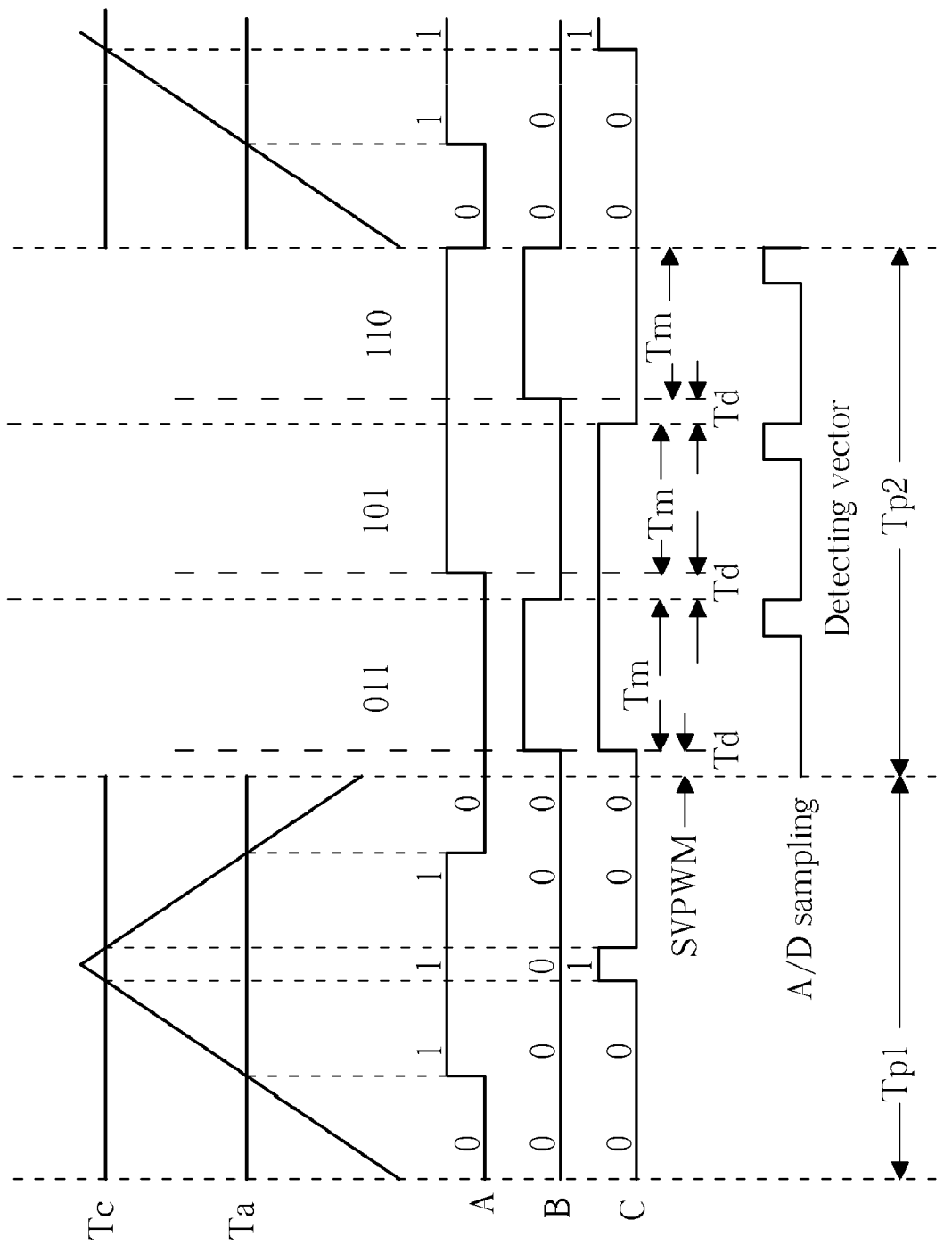
FIG. 14 is a simplified timing diagram of FIG. 12.
Figure 15:
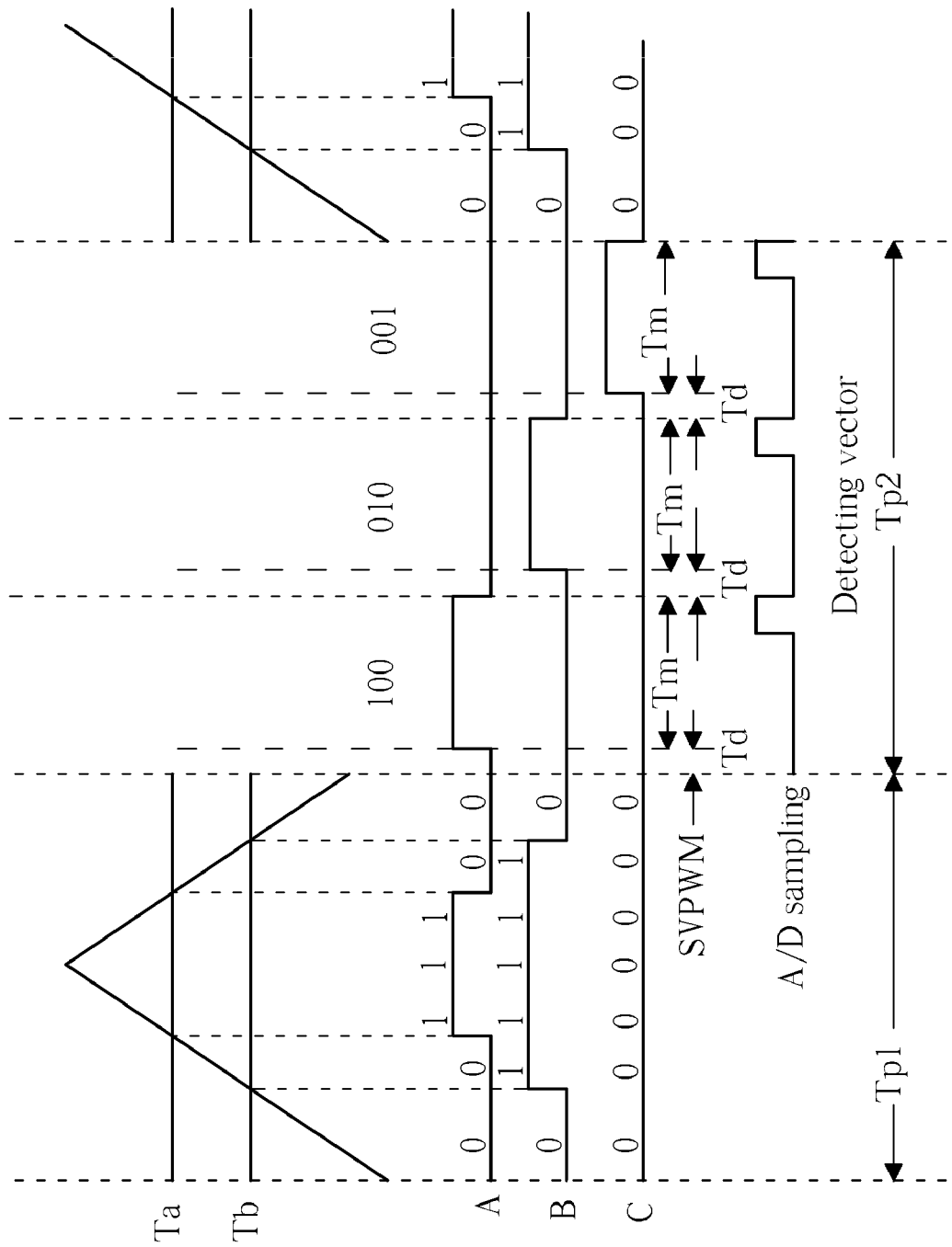
FIG. 15 is a simplified timing diagram of FIG. 13.

FIG. 14 is a simplified timing diagram of FIG. 12. In FIG. 14, the zero vector (111) is replaced by another zero vector (000), as a result, the "B" signal in time span Tp1 becomes all zero; therefore, the comparison between the ratio of carrier waves and Tb can be omitted. Please refer to FIG. 14. In FIG. 14, the comparison between the triangle wave and Tb in the upper part in the first-half time span Tp1 of FIG. 14 is omitted. The sequence of voltage space vectors after replacement becomes (000), (100), (101), (000), (101), (100), (000); in addition, merge the time of the central zero vector (000) into the time of the zero vector (000) at two ends averagely, a simplified sequence of voltage space vectors (000), (100), (101), (100), and (000) can be generated accordingly, as shown in FIG. 14. Similarly, FIG. 15 is a simplified timing diagram of FIG. 13. In FIG. 15, the zero vector (111) is replaced by another zero vector (000), as a result, the "C" signal in time span Tp1 becomes all zero; therefore, the comparison between the ratio of carrier waves and the Tc can be omitted. Please refer to FIG. 15. In FIG. 15, the comparison between the triangle wave and Tc in the upper part in the first-half time span Tp1 of FIG. 15 is omitted. The sequence of voltage space vectors after replacement becomes (000), (010), (110), (000), (110), (010), (000); in addition, merge the time of the central zero vector (000) into the time of the zero vector (000) at two ends averagely, a simplified sequence of voltage space vectors (000), (010), (110), (010), and (000) can be generated accordingly, as shown in FIG. 15.

Figure 16:
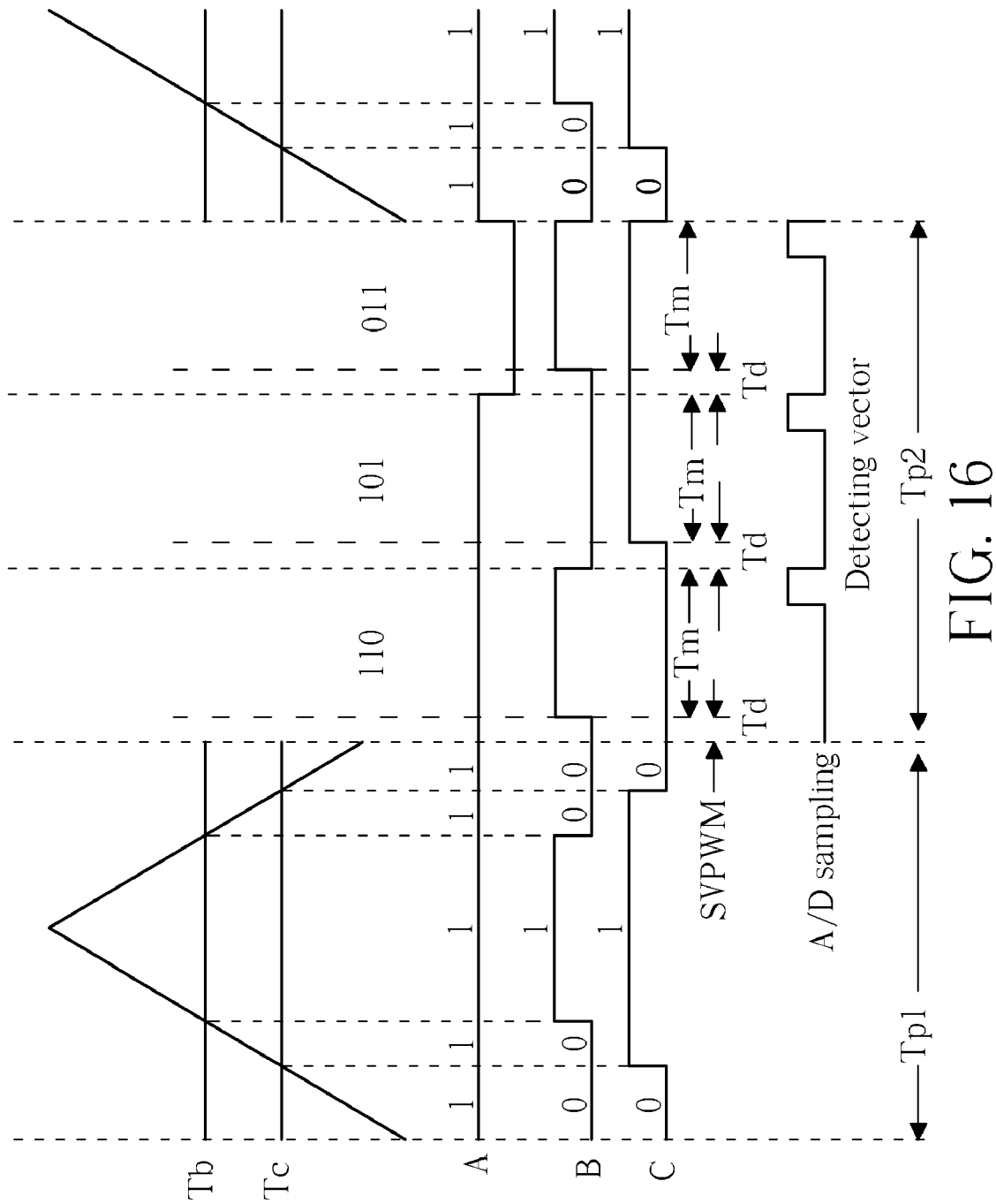
FIG. 16 is another simplified timing diagram of FIG. 12.
Figure 17:
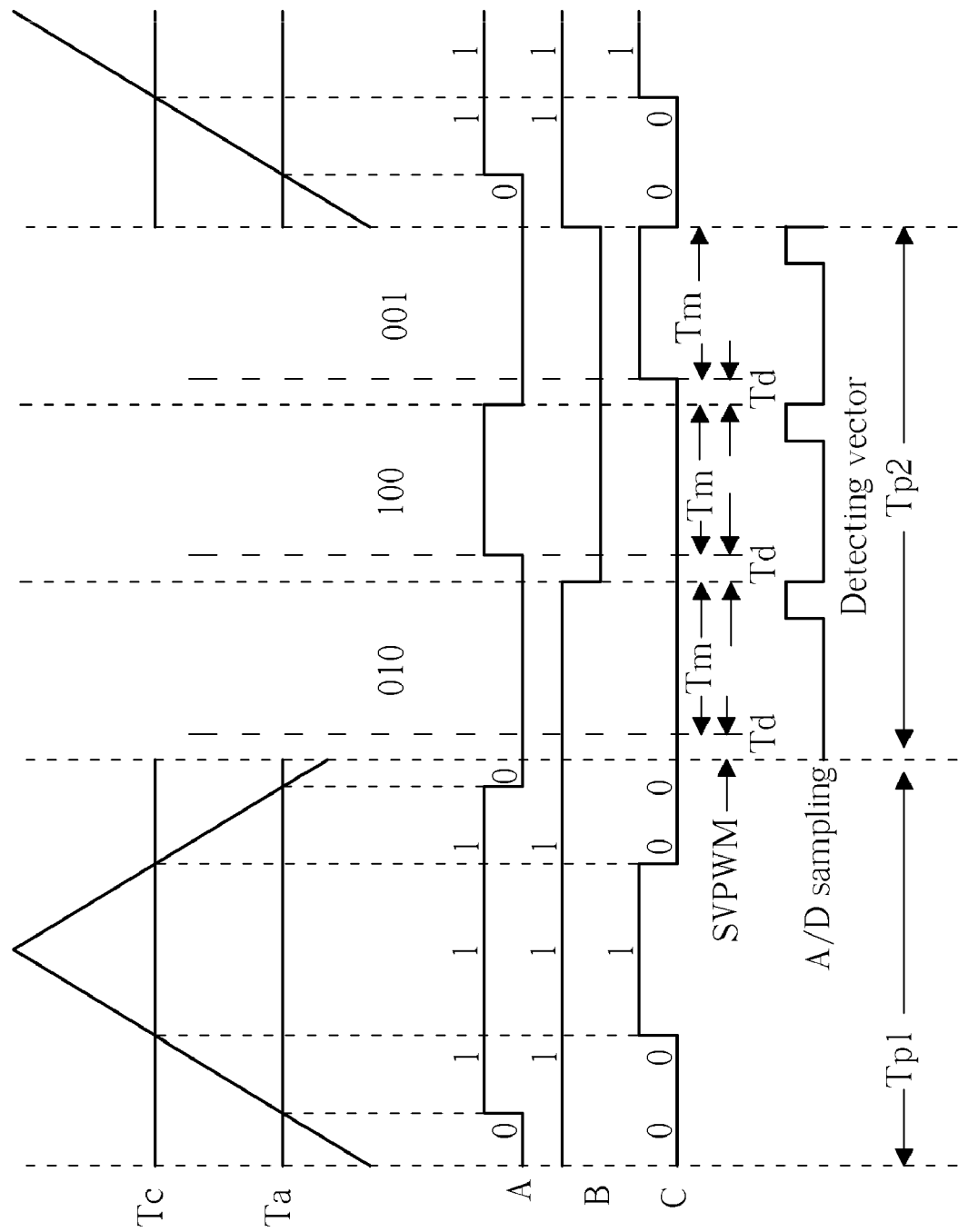
FIG. 17 is another simplified timing diagram of FIG. 13.

FIG. 16 is another simplified timing diagram of FIG. 12. In FIG. 16, the zero vector (000) is replaced by another zero vector (111), as a result, the "A" signal in time span Tp1 becomes all "1"; therefore, the comparison between the ratio of carrier waves and Ta can be omitted. Please refer to FIG. 16. In FIG. 16, the comparison between the triangle wave and Ta in the upper part in the first-half time span Tp1 of FIG. 16 is omitted. The sequence of voltage space vectors after replacement becomes (111), (100), (101), (111), (101), (100), (111). However, how to adjust this sequence to get the fewest switching times of those 6 transistors in FIG. 2 should be taken into consideration. According to this embodiment shown in FIG. 16, merge the time of the zero vector (111) at two ends into the time of the central zero vector (111), and the fewest switching times of those 6 transistors can be achieved. Hence, a simplified sequence of voltage space vectors (100), (101), (111), (101), and (100) can be generated accordingly, as shown in FIG. 16. Similarly, FIG. 17 is another simplified timing diagram of FIG. 13. In FIG. 17, the zero vector (000) is replaced by another zero vector (111), as a result, the "B"

signal in time span Tp1 becomes all "1"; therefore, the comparison between the ratio of carrier waves and Tb can be omitted. Please refer to FIG. 17. In FIG. 17, the comparison between the triangle wave and Tb in the upper part in the first-half time span Tp1 of FIG. 17 is omitted. The sequence of voltage space vectors after replacement becomes (111), (010), (110), (111), (110), (010), (111). For the same reason, how to adjust this sequence to get the fewest switching times of those 6 transistors is also taken into consideration here. According to this embodiment shown in FIG. 17, merge the time of the zero vector (111) at two ends into the time of the central zero vector (111), and the fewest switching times of those 6 transistors can be achieved. Hence, a simplified sequence of voltage space vectors (010), (110), (111), (110), and (010) can be generated accordingly, as shown in FIG. 17.

The above-mentioned method simplifying the sequence of voltage space vectors in SVPWM is accomplished through the software/firmware written in the control chip 8, and is capable of reducing the switching times of the transistors. As a result, the power loss caused by switching the transistors can be reduced, and the efficiency of SVPWM could be increased accordingly. Moreover, the present invention adds 3 detecting vectors after the original voltage space vector instead of inserting them into the modulation of the original voltage space vector to prevent influencing the modulation of the original voltage space vector. In other words, no matter the original voltage space vector is modulated by SPWM or SVPWM, the method released by the present invention can be applied as well. Please note that although the method of the present invention is for solving the problem caused by the voltage space vectors located in the immeasurable region, the method of the present invention is not limited to be only applied to them, any voltage space vector in a voltage space vector drawing formed by the 6 voltage space unit vectors V1~V6 can be applied as well.

Figure 18:
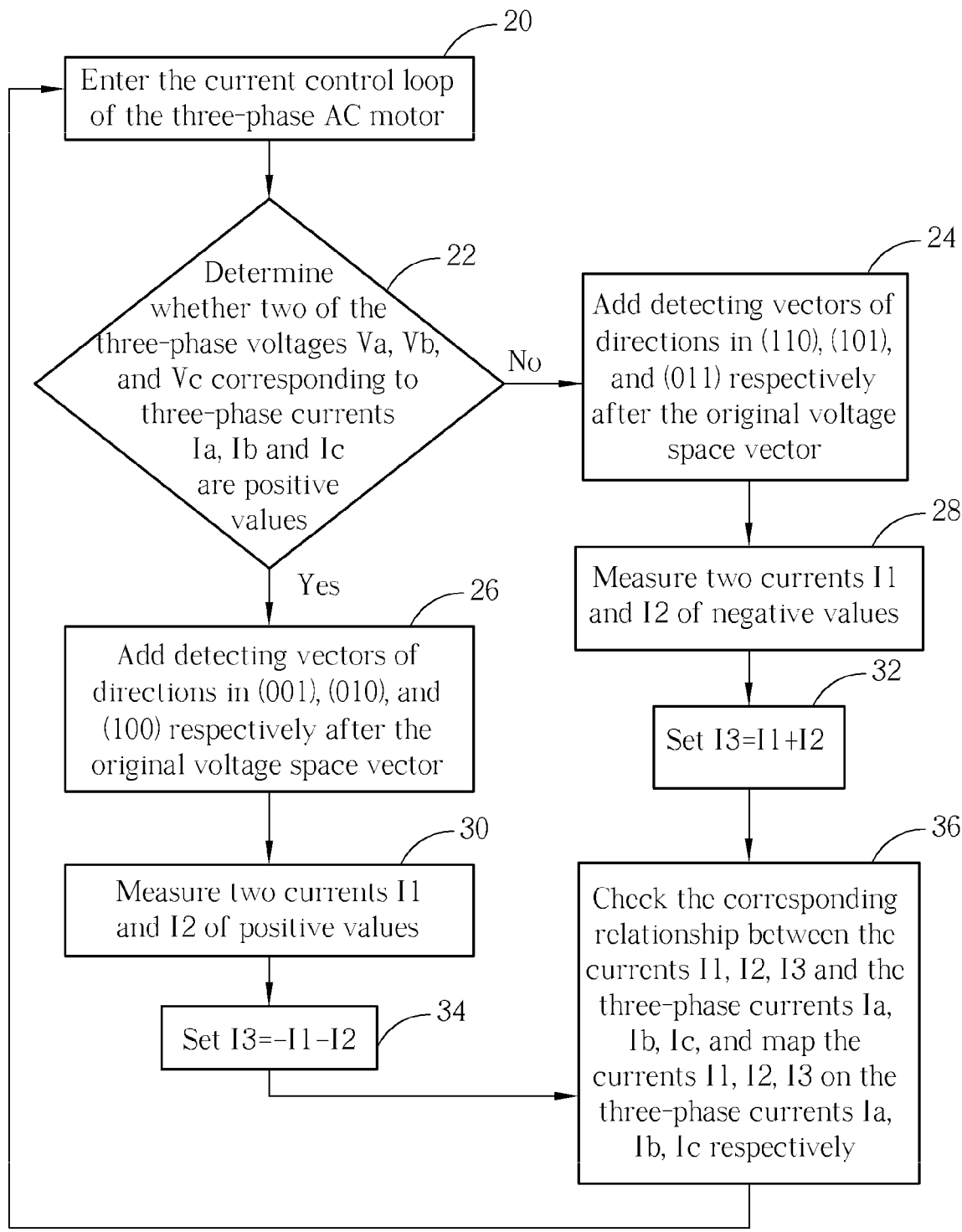
FIG. 18 is a flow chart of the method for measuring the voltage space vectors located in the immeasurable region according to the present invention.

FIG. 18 is a flow chart of the method of the present invention for measuring the voltage space vectors located in the immeasurable region, including the following steps:

Step 20: Enter the current control loop of the three-phase AC motor (the current control loop can be the control chip 8 or some control principles).

Step 22: Determine whether two of the three-phase voltages Va, Vb, and Vc corresponding to three-phase currents Ia, Ib and Ic are positive values. If so, go to step 26; if not, go to step 24.

Step 24: Add detecting vectors of directions in (110), (101), and (011) respectively after the original voltage space vector, and go to step 28.

Step 26: Add detecting vectors of directions in (001), (010), and (100) respectively after the original voltage space vector, and go to step 30.

Step 28: Measure two currents I1 and I2 of negative values, and go to step 32.

Step 30: Measure two currents I1 and I2 of positive values, and go to step 34.

Step 32: Set I3=I1+I2, and go to step 36.

Step 34: Set I3=−I1−I2, and go to step 36.

Step 36: Check the corresponding relationship between the currents I1, I2, I3 and the three-phase currents Ia, Ib, Ic, and map the currents I1, I2, I3 on the three-phase currents Ia, Ib, Ic respectively. Go back to step 20, and transfer the collected information of three-phase currents to the current control loop to adjust the width of pulses.

According to the method released by the present invention, first determine whether two of the three-phase voltages Va, Vb, and Vc corresponding to three-phase currents Ia, Ib and Ic are positive values in order to determine which set of 3 detecting vectors should be added. If two of the three-phase voltages Va, Vb, and Vc are positive, add a set of 3 detecting vectors of directions in (001), (010), and (100) respectively after the original voltage space vector. If two of the three-phase voltages Va, Vb, and Vc are negative, add another set of 3 detecting vectors of directions in (110), (101), and (011) respectively after the original voltage space vector. Secondly, measure two of the three-phase currents I1 and I2. If the added detecting vectors are of directions in (110), (101), and (011) respectively, then the measured currents I1 and I2 are of negative values, and set the third phase current I3=I1+I2; if the added detecting vectors are of directions in (001), (010), and (100) respectively, then the measured currents I1 and I2 are of positive values, and set the third phase current I3=−I1−I2. Lastly check the corresponding relationship between the currents I1, I2, I3 and the three-phase currents Ia, Ib, Ic, and map the currents I1, I2, I3 on the three-phase currents Ia, Ib, Ic respectively. After mapping, send the information of the three-phase currents Ia, Ib, and Ic to the control chip 8 as feedback signals, and a close-loop control of the three-phase AC motor is accomplished.

Figure 19:
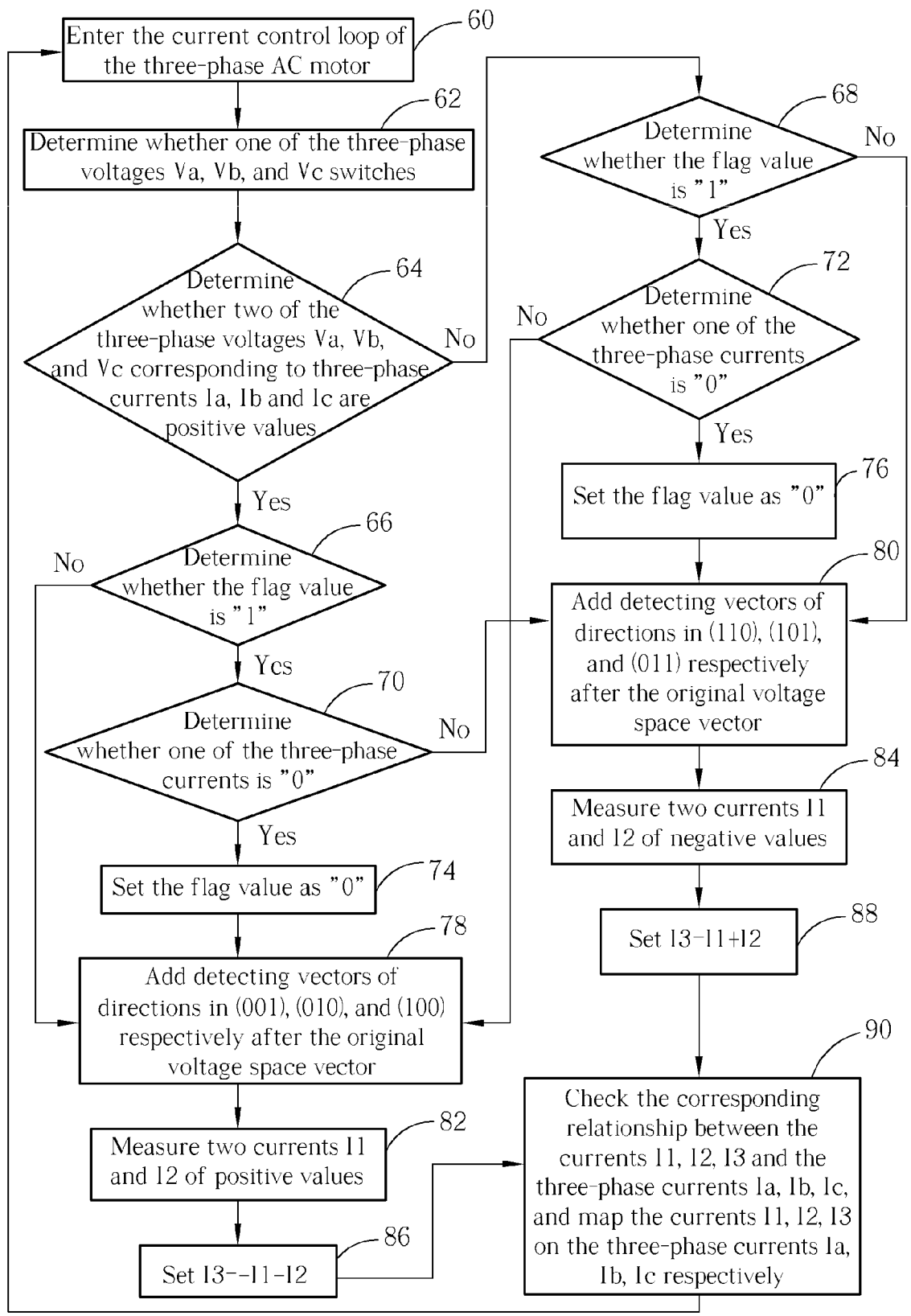
FIG. 19 is a flow chart of considering the discontinuity of currents in a switching period according to the flow chart of FIG. 18.

However, if the problem of discontinuous currents in a switching period is taken into consideration, according to the inductive characteristics of the motor in circuitry, the motor switches its voltages earlier than its current. Therefore, there is a short period in which the phase voltage has already been switched, but the phase current remains the same. In such a period, if the detecting vectors are added, it will lead to a mistake. The proper time for the detecting vectors to be added is after both the voltage and the current are switched. Hence, FIG. 19 is illustrated for modification of FIG. 18 for such a period. FIG. 19 is a flow chart of considering the discontinuity of currents in a switching period according to the flow chart of FIG. 18, comprising the following steps:

Step 60: Enter the current control loop of the three-phase AC motor (the current control loop can be the control chip 8 or some control principles).

Step 62: Determine whether one of the three-phase voltages Va, Vb, and Vc switches. If so, set a flag value as "1".

Step 64: Determine whether two of the three-phase voltages Va, Vb, and Vc corresponding to three-phase currents Ia, Ib and Ic are positive values. If so, go to step 66; if not, go to step 68.

Step 66: Determine whether the flag value is "1". If so, go to step 70, if not, go to step 78.

Step 68: Determine whether the flag value is "1". If so, go to step 72, if not, go to step 80.

Step 70: Determine whether one of the three-phase currents is "0". If so, go to step 74, if not, go to step 80.

Step 72: Determine whether one of the three-phase currents is "0". If so, go to step 76, if not, go to step 78.

Step 74: Set the flag value as "0", and go to step 78.

Step 76: Set the flag value as "0", and go to step 80.

Step 78: Add detecting vectors of directions in (001), (010), and (100) respectively after the original voltage space vector, and go to step 82.

Step 80: Add detecting vectors of directions in (110), (101), and (011) respectively after the original voltage space vector, and go to step 84.

Step 82: Measure two currents I1 and I2 of positive values, and go to step 86.

Step 84: Measure two currents I1 and I2 of negative values, and go to step 88.

Step 86: Set I3=−I1−I2, and go to step 90.

Step 88: Set I3=I1+I2, and go to step 90.

Step 90: Check the corresponding relationship between the currents I1, I2, I3 and the three-phase currents Ia, Ib, Ic, and map the currents I1, I2, I3 on the three-phase currents Ia, Ib, Ic respectively. Go back to step 60, and transfer the collected information of three-phase currents to the current control loop to adjust the width of pulses.

Figure 21:
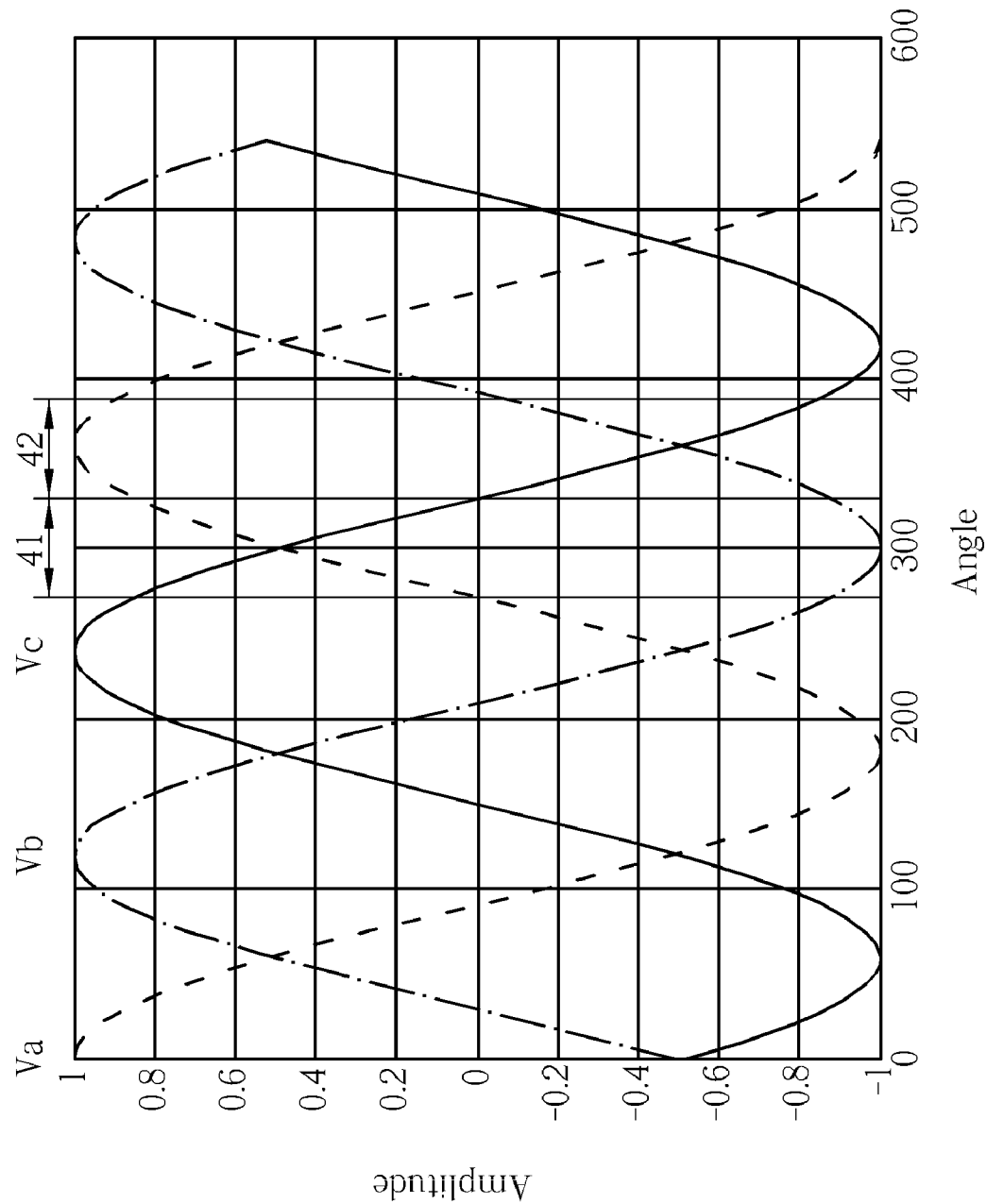
FIG. 21 is an angle-to-amplitude drawing of three-phase voltages Va, Vb, and Vc.

According to the method of the present invention, first determine whether one of the three-phase voltages Va, Vb, and Vc switches from a high voltage to a low voltage, or from a low voltage to a high voltage. If so, set a flag value (stored in a register) as "1". The register is used for determining whether there is one phase current equivalent to zero. Please refer to FIG. 21. FIG. 21 is an angle-to-amplitude drawing of three-phase voltages Va, Vb, and Vc. Taking the Vc in FIG. 21 as an example, while entering region 42 from region 41, Vc changes from a positive voltage to a negative voltage, therefore the register is set as "1". Meanwhile, according to the inductive characteristics of the motor in circuitry, the phase of current lags the phase of voltage a short period in the motor. As a result, the current Ic has not switched from the positive value to the negative value as soon as the voltage did. The new set of detecting vectors ought to be added in after both the voltage and the current are switched from the positive value to the negative value. Therefore determine whether the current Ic equals zero or not. If the current Ic equals zero, set the flag value (the register) as "0", then the new set of detecting vectors is ready to be added in, otherwise the detecting vectors remain unchanged. Secondly, entering the current control loop of the three-phase AC motor, determine whether two of the three-phase voltages Va, Vb, and Vc corresponding to three-phase currents Ia, Ib and Ic are positive values in order to determine which set of 3 detecting vectors should be added. If two of the three-phase voltages Va, Vb, and Vc are of positive values, and the flag value is "1", it represents one of the three-phase voltages switches, therefore further determine whether the phase current corresponding to the phase voltage equals zero. If so, it represents the phase current corresponding to the phase voltage is going to be switched, and the new detecting vectors are ready to be added. Hence set the flag value to "0", and add the new set of the 3 detecting vectors of directions in (001), (010), and (100) respectively after the original voltage space vector. If the flag value is not "1", it represents none of the phase current switches, therefore directly add the new set of 3 detecting vectors of directions in (001), (010), and (100) respectively after the original voltage space vector. If two of the three-phase voltages Va, Vb, and Vc are negative, and the flag value is "1", it represents one of the three-phase voltages switches, therefore further determine whether the phase current corresponding to the phase voltage equals zero. If so, it represents the phase current corresponding to the phase voltage is going to switch, and the new detecting vectors are ready to be added. Hence set the flag value to "0", and add the new set of the 3 detecting vectors of directions in (110), (101), and (011) respectively after the original voltage space vector. If the flag value is not "1", it represents none of the phase currents switches, therefore directly add the new set of the 3 detecting vectors of directions in (110), (101), and (011) respectively after the original voltage space vector. Next, measure two of the three-phase currents I1 and I2. If the added detecting vectors are of directions in (110), (101), and (011) respectively, then the measured currents I1 and I2 are of negative values, and set the third phase current I3=I1+I2; if the added detecting vectors are of directions in (001), (010), and (100) respectively, then the measured currents I1 and I2 are of positive values, and set the third phase current I3=−I1−I2. Lastly check the corresponding relationship between the currents I1, I2, I3 and the three-phase currents Ia, Ib, Ic, and map the currents I1, I2, I3 on the three-phase currents Ia, Ib, Ic respectively. After mapping, send the information of the three-phase currents Ia, Ib, and Ic to the control chip 8 as feedback signals, and a close-loop control of the three-phase AC motor is accomplished.

The present invention utilizes a set of three detecting vectors added after the original voltage space vector to make the length of the original voltage space vector located in the immeasurable region long enough to be measure, then measure two of the three-phase currents. Calculate the third phase current according to the current summing up to zero in the case of a linear balanced load. Through adding different sets of detecting vectors, the direction of the current flowing through the DC-link current-sensing resistor can be adjusted to be always positive, therefore a dual supply op amp used in the conventional design can be replaced by a single supply op amp, and the additional dual power for supplying the dual supply op amp in the circuitry can be omitted as well.

The addition of detecting vectors will influence the circuitry on:

1. The switching time of the circuitry from Tp1 extended to (Tp1+Tp2) (Tp2 is the time for adding the set of three detecting vectors), therefore the frequency of the current loop changes, and so does the bandwidth.

Figure 22:
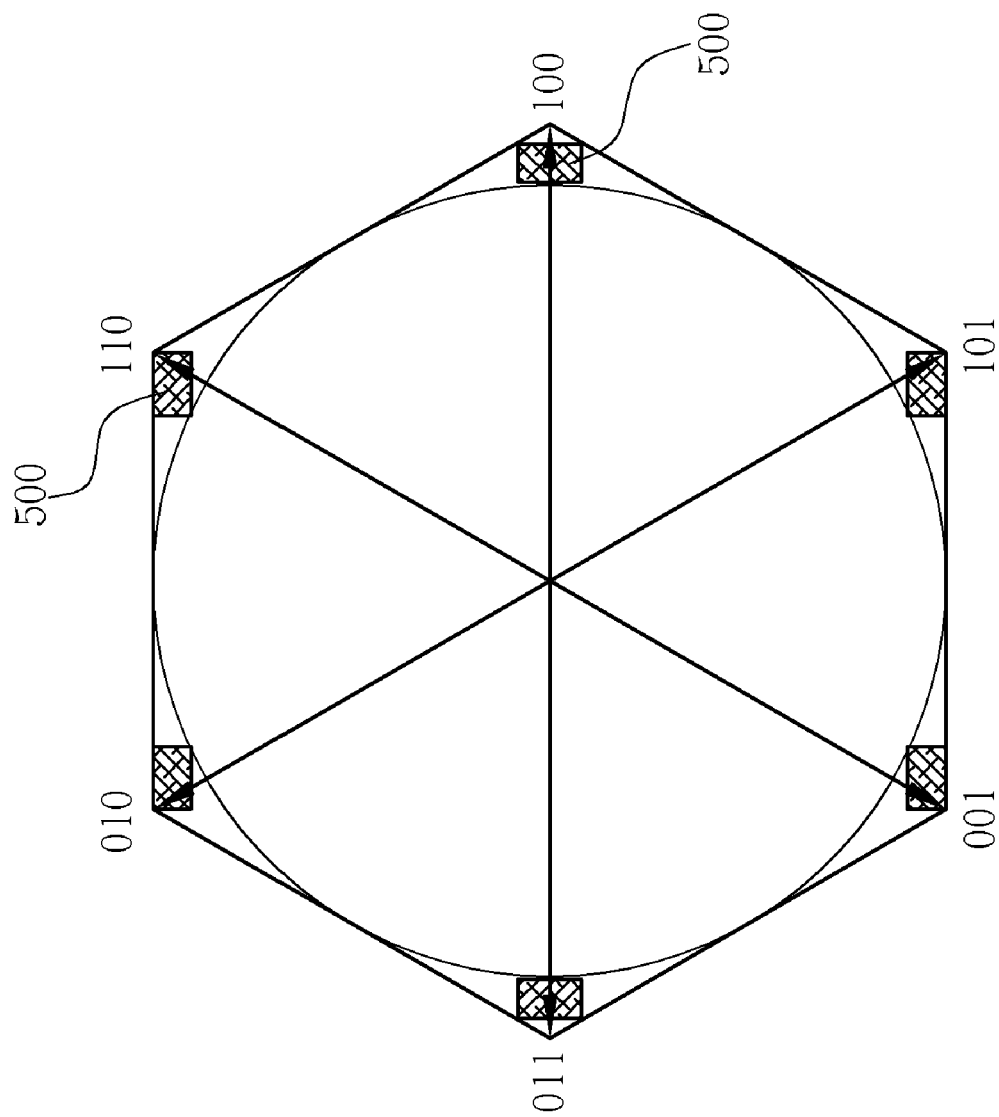
FIG. 22 illustrates a circle boundary of current distortion and saturation regions in a voltage space vector drawing formed by the voltage space unit vectors according to the present invention.

2. The length of the original voltage space vector shrinks Tp1/(Tp1+Tp2) times accordingly, in order to keep the original voltage space vector unchanged, the voltage of the original voltage space vector should be magnified (Tp1+Tp2)/Tp1 times. However, this method will produce saturation regions 500, as shown in FIG. 22. FIG. 22 is a voltage space vector drawing formed by the voltage space unit vectors V1~V6, the circle in FIG. 22 represents the length limit for the voltage space vectors leading to current distortion, the saturation regions 500 (the shaded parts) in FIG. 22 represent the regions of the voltage space vectors whose lengths are affected by the method offered by the present invention. Therefore, in order to keep the current undistorted, the voltage space vectors should be confined inside the region of the circle. Moreover, in order to keep the size of the saturation regions 500 as small as possible, maximally shrink the time period for adding the 3 detecting vectors to a minimum value of (Tm+Td) for sampling. Consequently, the time period for adding the 3 detecting vectors cannot be extended unlimitedly, it should be a proper value greater than (Tm+Td). How to determine the length of the time for adding the 3 detecting vectors is related to the value of (Tm+Td), the transition time for power transistors being switched-on and cut-off, the slew rate of the op amp, and the sampling time of the AD converter.

Figure 20:
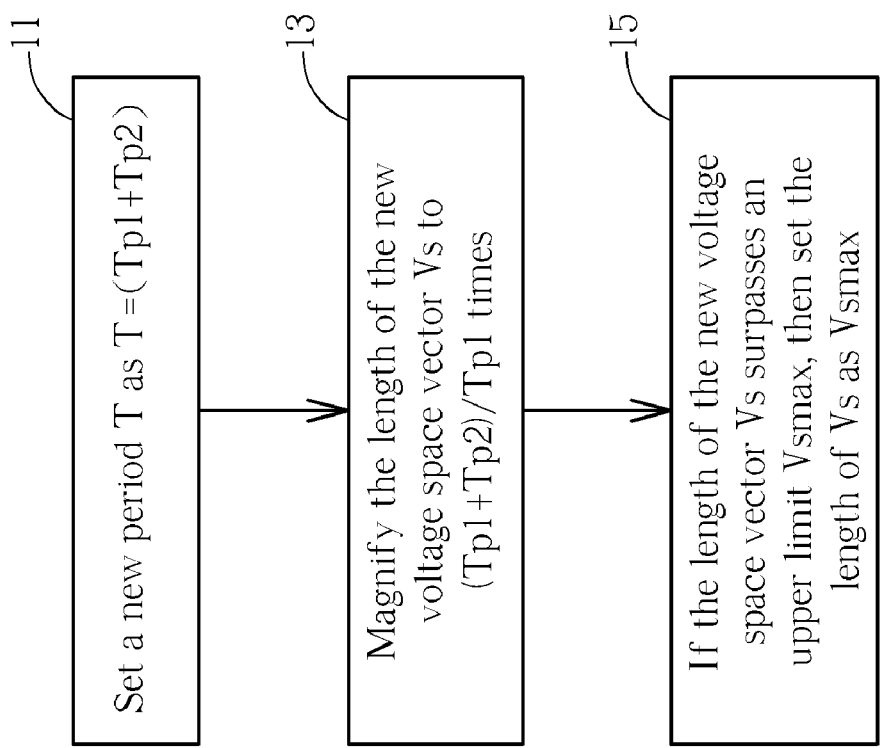
FIG. 20 is a flow chart of compensating the length of the original voltage space vector shortened by the method of the present invention.

Please refer to FIG. 20. FIG. 20 is a flow chart for compensating the length of the original voltage space vector shortened by the method of the present invention. In FIG. 20, set an upper limit of the length of the original voltage space vector Vsmax, if the length of the original voltage space vector surpasses the upper limit Vsmax, then set the length of the original voltage space vector as Vsmax. The steps included in FIG. 20 are:

Step 11: Set a new period T as T=(Tp1+Tp2).

Step 13: Magnify the length of the new voltage space vector Vs to (Tp1+Tp2)/Tp1 times.

Step 15: If the length of the new voltage space vector Vs surpasses an upper limit Vsmax, then set the length of Vs as Vsmax.

Figure 23:
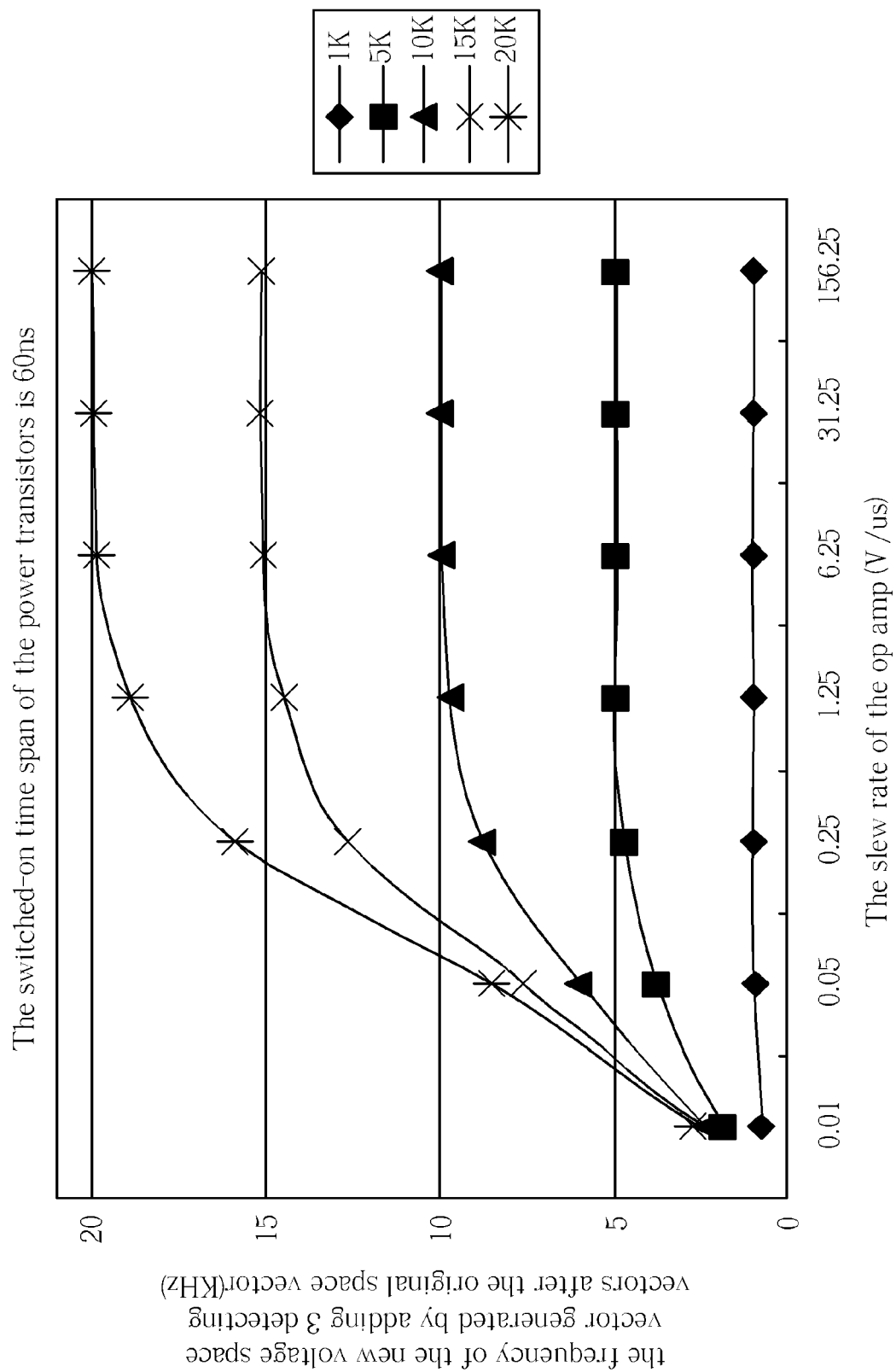
FIG. 23 is a diagram of the slew rate of the op amp to the frequency of the new voltage space vector under different modulation frequencies of SVPWM.
Figure 24:
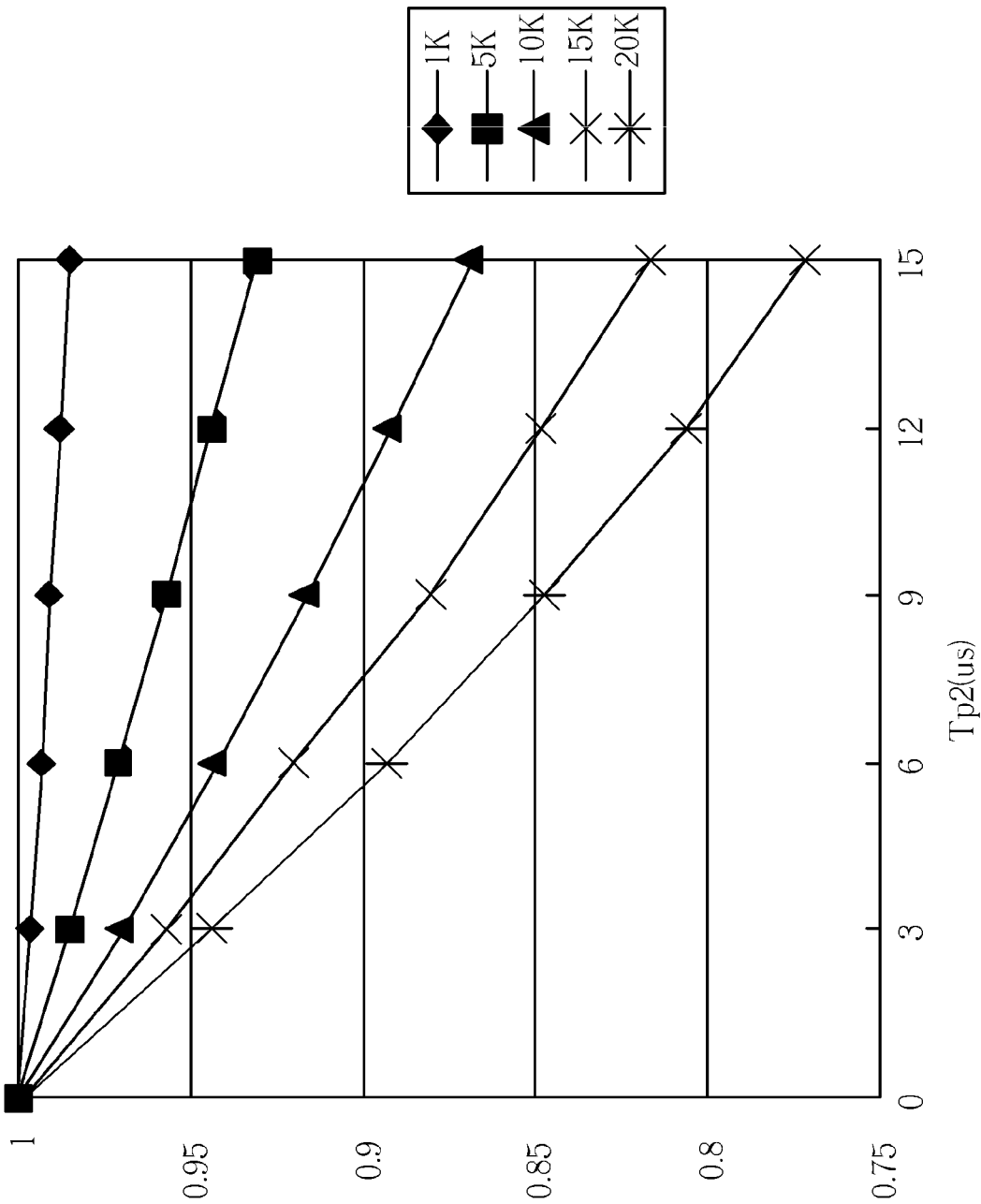
FIG. 24 is a diagram of the time span Tp2 to the length of the original voltage space vector under different modulation frequencies of SVPWM.
Figure 25:
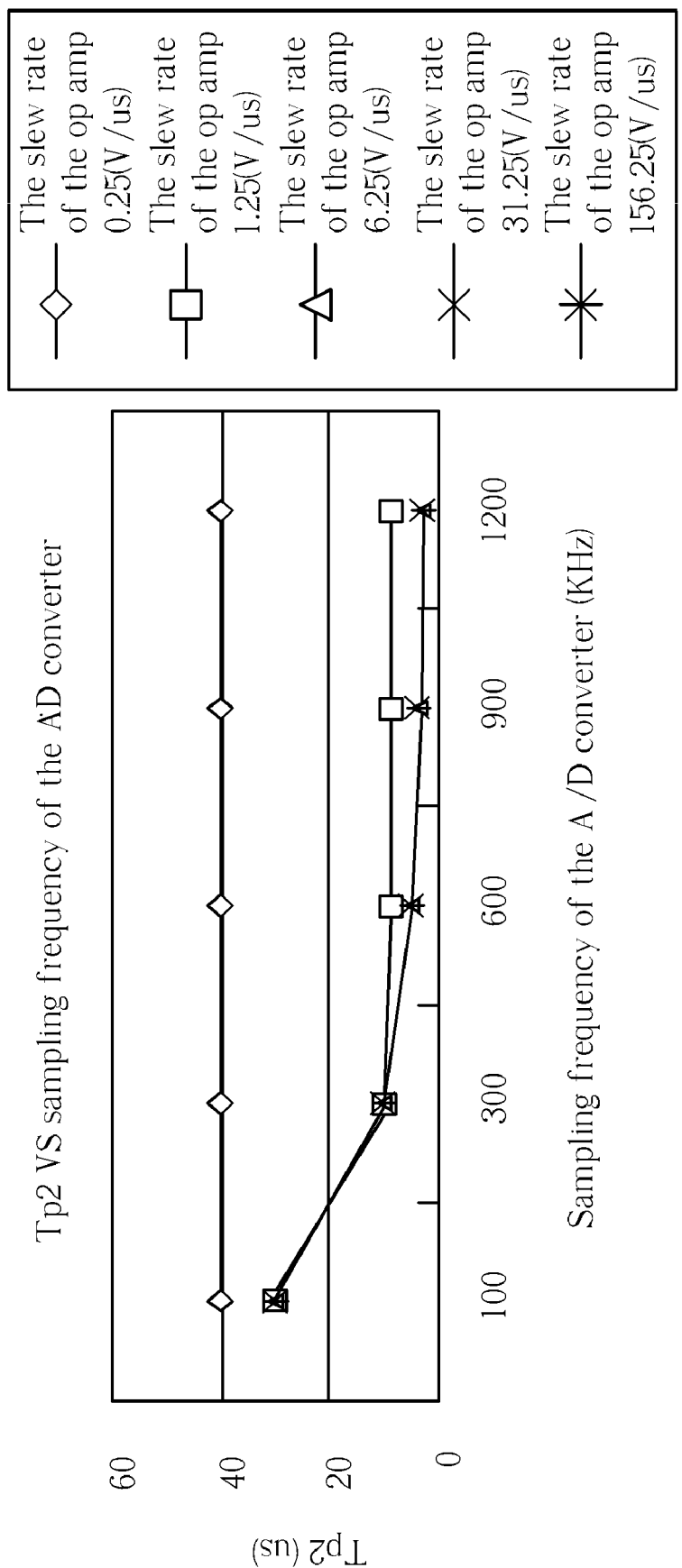
FIG. 25 is a diagram of the time span Tp2 for adding the 3 detecting vectors to the sampling frequency of the A/D converter under different slew rates of the op amp.

The following description is for explaining the influence performed by the transition time for power transistors being switched-on and cut-off, the slew rate of the op amp, and the sampling time of the AD converter on the time period for adding the 3 detecting vectors. Please refer to FIGS. 23, 24, and 25 in all. FIG. 23 is a diagram of the slew rate of the op amp to the frequency of the new voltage space vector generated by adding 3 detecting vectors after the original voltage space vector under different modulation frequencies of SVPWM (but the switched-on time span of the power transistors is fixed). In FIG. 23, the switched-on time span of the power transistors is 60 ns, different curves represent different modulation frequencies of SVPWM, the vertical axis represents the frequency of the new voltage space vector generated by adding 3 detecting vectors after the original space vector, and the horizontal axis represents the slew rate of the op amp. From FIG. 23, we can see when the slew rate of the op amp is greater than 31.25 (V/us), the frequency of the new voltage space vector will be affected less by the slew rate. It means the higher the slew rate of the op amp, the less the influence it plays on the frequency of the new voltage space vector; because the higher the slew rate is, the shorter the time span for adding the detecting vectors could be. As the ratio of Tp2 in the new period (Tp1+Tp2) decreases, the less influence it plays on the new period relatively. FIG. 24 illustrates the influence performed by different time spans Tp2 on the length of the original voltage space vector under different modulation frequencies of SVPWM. In FIG. 24, different curves represent different modulation frequencies of SVPWM, the vertical axis represents the ratio of the length of the original voltage space vector Vs to the new voltage space vector generated by adding 3 detecting vectors after the original voltage space vector Vs, and the horizontal axis represents the time span Tp2 for adding the 3 detecting vectors. From FIG. 24, we can see the longer the time span Tp2, the greater influence it plays on the ratio of the length of the original voltage space vector Vs to the new voltage space vector. FIG. 25 is a diagram of the time span Tp2 for adding the 3 detecting vectors to the sampling frequency of the A/D converter under different slew rates of the op amp. In FIG. 25, we can see that different curves represent different slew rates of the op amp, the vertical axis represents the time span Tp2 for adding the 3 detecting vectors, and the horizontal axis represents the sampling frequency of the op amp. From FIG. 25, we can see that when the sampling frequency of the A/D converter is greater than 600 KHz, the influence it plays on the time span Tp2 decreases. That is the greater the sampling frequency of the A/D converter, the less influence it plays on the time span Tp2. It also can be seen from FIG. 25 that when the slew rate of the op amp equals 0.25 (V/us), no matter what value the sampling frequency of the A/D converter becomes, the time span Tp2 remains a constant value. In other words, while the sampling frequency of the A/D converter equivalent to 100 KHz, and the slew rate of the op amp greater than 1.25 (V/us), the time span Tp2 for adding 3 detecting vectors will not be affected by them any more.

Three conditions listed below should be contented for reducing the time span Tp2:

1. Shorten the transition time for power transistors being switched-on and cut-off.
2. Enlarge the slew rate of the op amp.
3. Speed up the sampling rate of the A/D converter.

Hence, proper components in circuitry should be chosen to raise the efficiency of the entire system according to the conditions given above.

Figure 26:
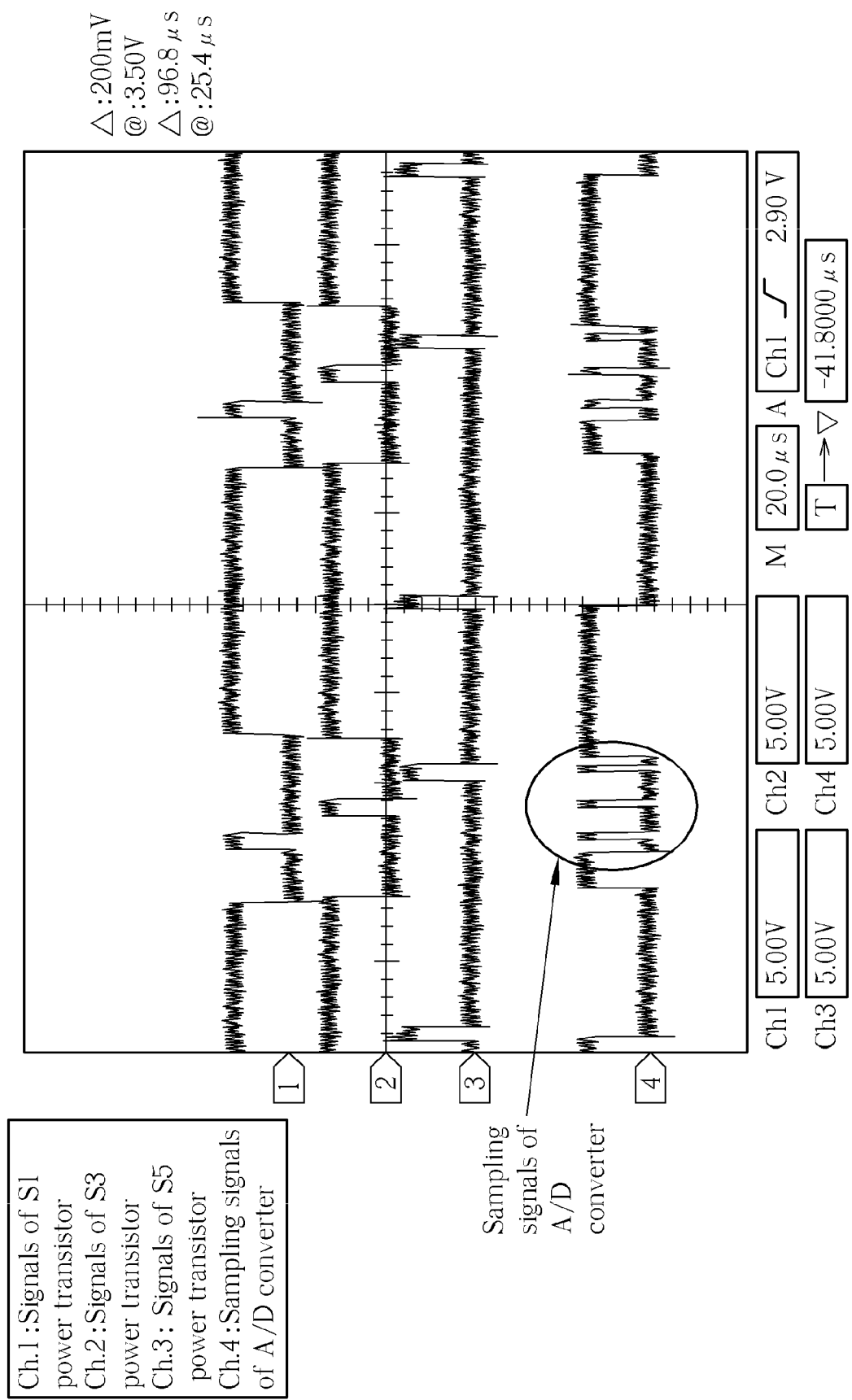
FIG. 26 is an experimental diagram of the sampling signals of the A/D converter in the region 2 of FIG. 11 in which the added vectors are (100), (010), and (001).
Figure 27:
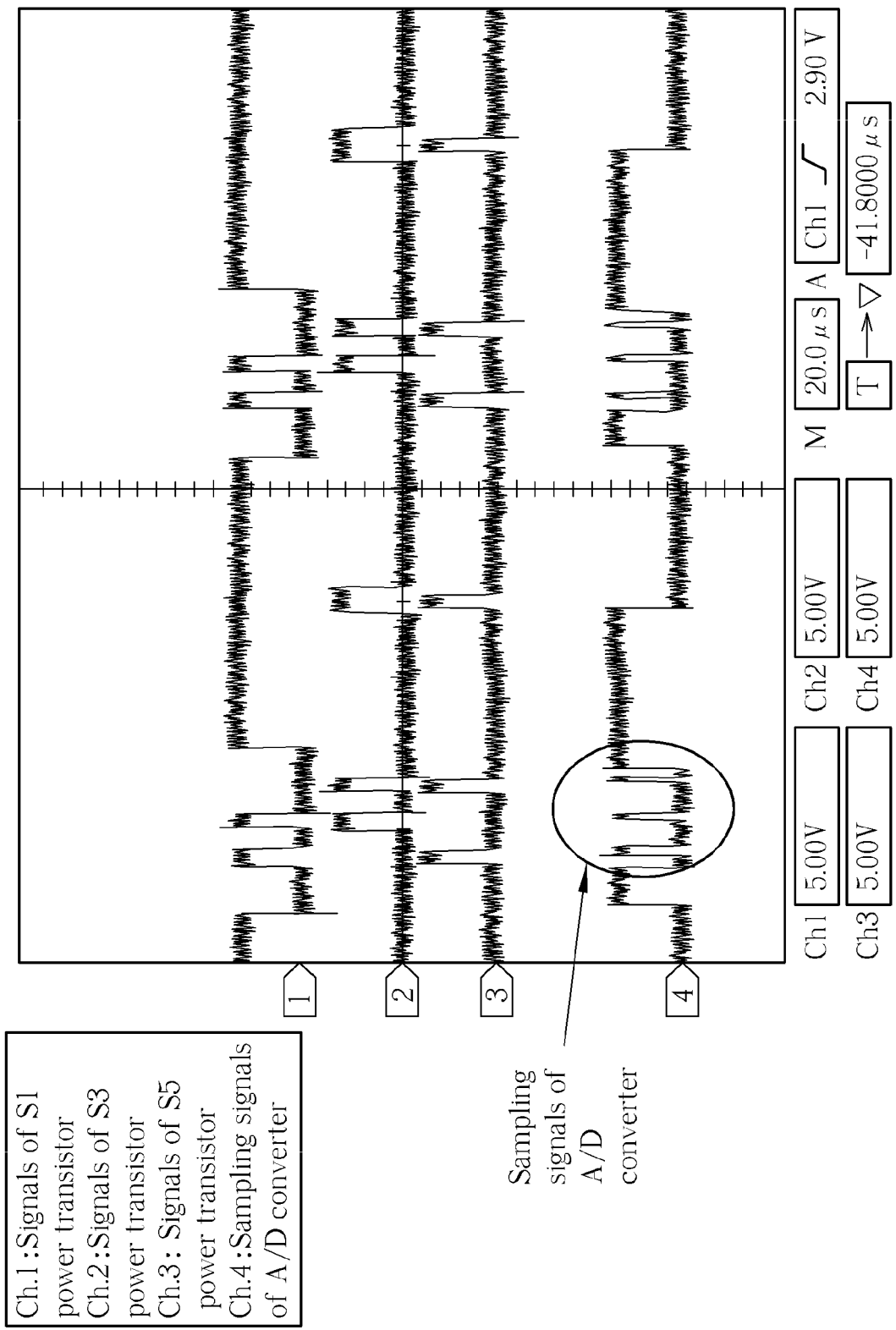
FIG. 27 is an experimental diagram of the sampling signals of the A/D converter in the region 1 of FIG. 11 in which the added vectors are (011), (101), and (110).

The aforementioned is the deduction of the theory of the present invention, the feasibility of the present invention is proven by the listed below experiment. Please refer to FIG. 26. FIG. 26 is an experimental diagram of the sampling signals of the A/D converter in the region 2 of FIG. 11 in which the added vectors are (100), (010), and (001). In FIG. 26, Ch1 represents the signals of the S1 power transistor, Ch2 represents the signals of the S3 power transistor, Ch3 represents the signals of the S5 power transistor, and Ch4 represents the sampling signals of the A/D converter. From FIG. 26, we can see the A/D converter samples correctly whenever each detecting vector is added. FIG. 27 is an experimental diagram of the sampling signals of the A/D converter in the region 1 of FIG. 11 in which the added vectors are (011), (101), and (110). In FIG. 27, Ch1 represents the signals of the S1 power transistor, Ch2 represents the signals of the S3 power transistor, Ch3 represents the signals of the S5 power transistor, and Ch4 represents the sampling signals of the A/D converter. From FIG. 27, we also can see the A/D converter samples correctly whenever each detecting vector is added.

Figure 28:
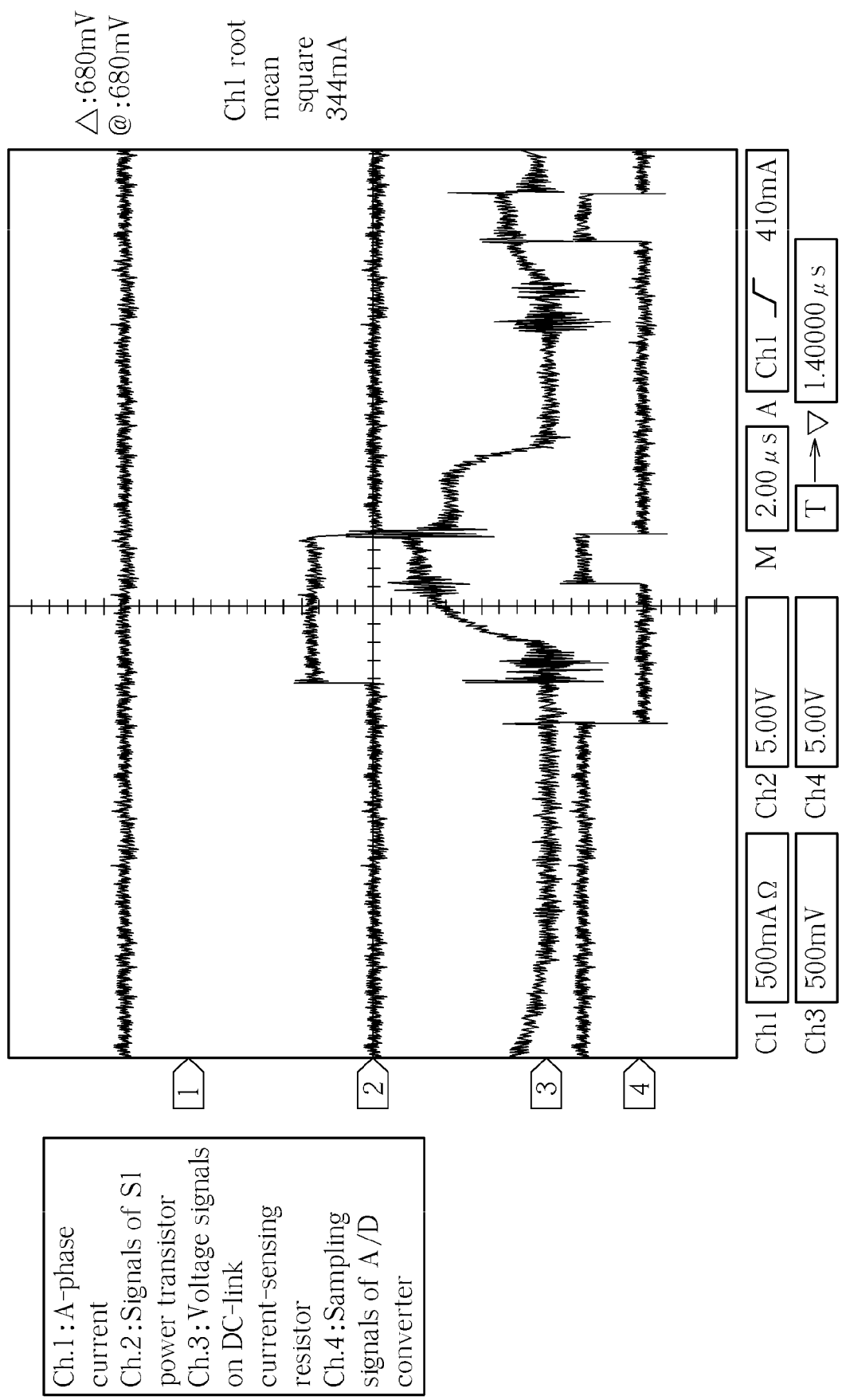
FIG. 28 is an experimental diagram of the A-phase current, the signals of the S1 power transistor, the voltage signals on the DC-link current-sensing resistor, and the sampling signals of the A/D converter.

After assuring that the A/D converter samples correctly, next the DC-link current flowing on the DC-link current-sensing resistor is measured to collect the information of the three-phase currents. Please refer to FIG. 28. FIG. 28 is an experimental diagram of the A-phase current, the signals of the S1 power transistor, the voltage signals on the DC-link current-sensing resistor, and the sampling signals of the A/D converter. In FIG. 28, Ch1 represents the A-phase current, Ch2 represents the signals of the S1 power transistor, Ch3 represents the voltage signals on the DC-link current-sensing resistor, and Ch4 represents the sampling signals of the A/D converter. From FIG. 28, we also can see the A-phase current is 344 mA, the voltage signal on the DC-link current-sensing resistor is 680 mV. Through the formula (1) listed below, whether the A-phase current is an average current (the current in a steady state) can be verified. If the measured A-phase current matches the result calculated from the formula (1), it shows that the method of the present invention works well.

$$344(mA)*6*0.33(\Omega))=681.12 \text{ mV} \quad \text{Formula (1)}$$

wherein 6 is the amplification rate of the op amp in the experiment, 0.33(Ω) is the resistance of the DC-link resistor in the experiment.

Figure 29:
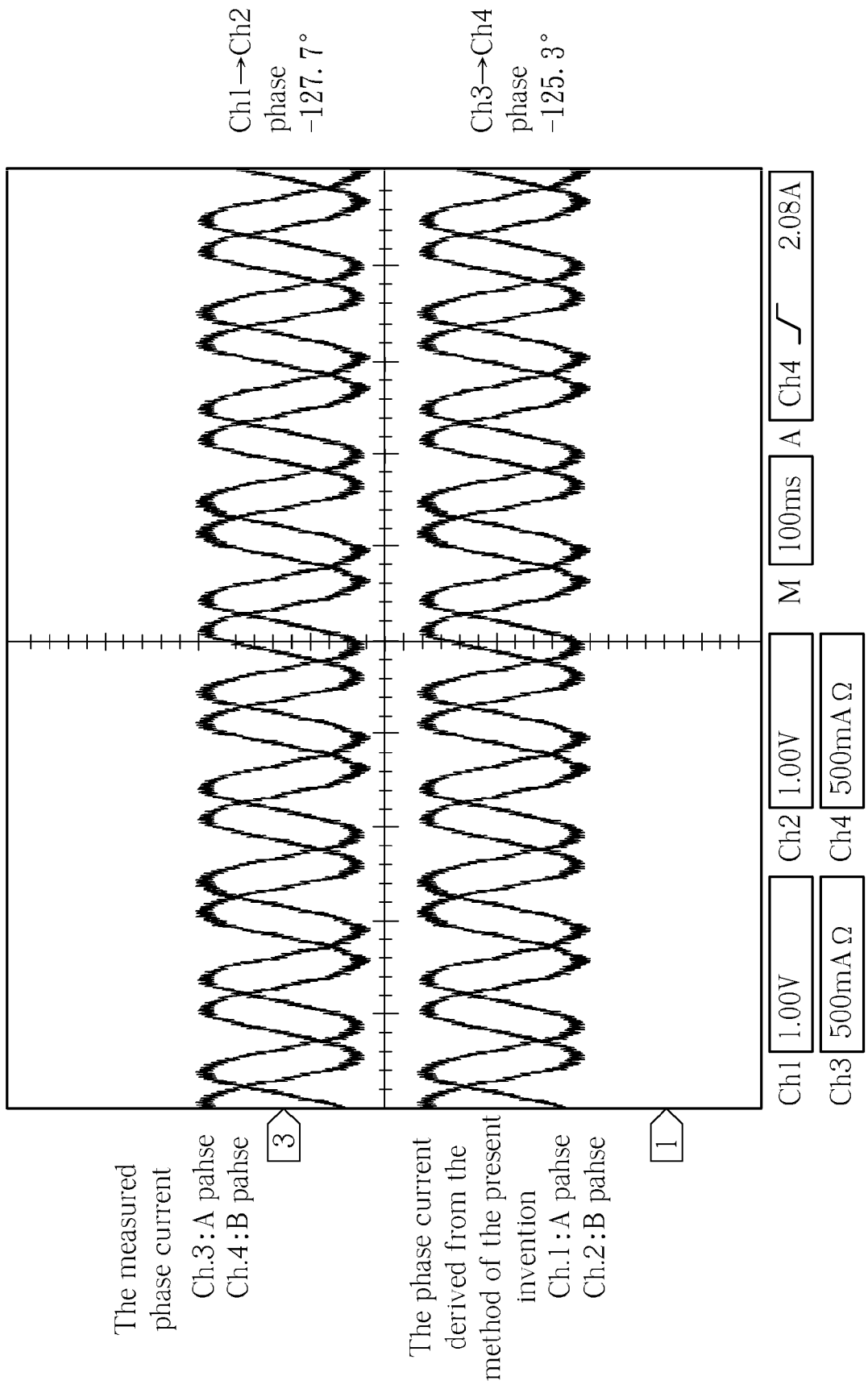
FIG. 29 is a comparing diagram of the measured phase current and the phase current derived from the method of the present invention.

Comparing the result of calculation (681.12 mV) and of measurement (681 mV), both values are very close. Please refer to FIG. 29. FIG. 29 is a comparing diagram of the measured phase current and the phase current derived from the method of the present invention. In FIG. 29, Ch1 represents the A-phase current derived from the method of the present invention, Ch2 represents the B-phase current derived from the method of the present invention, Ch3 represents the A-phase current measured by a galvanometer, and Ch4 represents the B-phase current measured by the galvanometer. From FIG. 29, we can see no matter the A-phase current or the B-phase current, the measured results and the derived results from the method of the present invention are almost similar, therefore we can conclude that the method of the present invention works well.

The method for adjusting a width of pulses through collecting information of a three-phase current released by the present invention does not need to consider switching different transistors in order to measure the corresponding phase current, reduces two phase-current sensors to one DC-link current sensor, and can be applied not only in SPWM system but also in SVPWM system. The present invention does not need a complicated calculation, or a complicated program, or moves the voltage space vector to avoid the problem caused by the voltage space vectors located in the immeasurable region. Moreover, the present invention adds different sets of detecting vectors to keep the current flowing through the DC-link current-sensing resistor in a single direction, therefore the dual supply op amp used in the conventional design can be replaced by a single supply op amp, and the additional dual power for supplying the dual supply op amp in the circuitry can be omitted as well. The present invention reduces the cost of the circuitry and simplifies the design of PCB. In addition, the sampling point is fixed, and does not need to be changed according to the switching timing point of PWM. Therefore the average current is derived easily, and the currents in three phases are generated more precisely as a result. The present invention also replaces two zero vectors (000) and (111) with one of both to simplify the sequence of voltage space vectors in an SVPWM system, reduces the switching times of the power transistors, and as a result the power loss caused by switching the transistors can be reduced. Although the addition of the 3 detecting vectors will shrink the length ratio of the original voltage space vector to the new voltage space vector, this problem can be conquered through programs or software. The present invention not only can be applied on three-phase motors, but also other three-phase devices driven by a PWM system.

Those skilled in the art will readily observe that numerous modifications and alterations of the device and method may be made while retaining the teachings of the invention.

What is claimed is:

1. A method for adjusting a width of pulses through collecting information of a three-phase current, comprising:
   an AC motor generating the three-phase current;
   modulating the three-phase current to generate an original voltage space vector through a pulse width modulator;
   detecting voltage composition of the original voltage space vector to generate a detecting result;
   offering three detecting vectors with a sum of zero according to the detecting result;
   adding the three detecting vectors with a sum of zero after the original voltage space vector orderly;
   sampling a current to generate a sampling result while adding the three detecting vectors; and
   adjusting the width of pulses generated by the pulse width modulator according to the sampling result.

2. The method of claim 1 wherein adding the three detecting vectors with a sum of zero after the original voltage space vector orderly is performed by adding the three detecting vectors with a sum of zero after the original voltage space vector orderly through the pulse width modulator.

3. The method of claim 1 wherein detecting the voltage composition of the original voltage space vector to generate the detecting result is detecting whether two phase voltages in the original voltage space vector are positive values.

4. The method of claim 1 wherein detecting the voltage composition of the original voltage space vector to generate the detecting result is detecting whether two phase voltages in the original voltage space vector are negative values.

5. The method of claim 1 wherein a length of each detecting vector is not shorter than a sum of a period for a transistor from being switched-on to a steady state, a transition period for an operational amplifier transiting from a low voltage to a high voltage, and a sampling period of an A/D converter.

6. A pulse-width modulation system adjusting a width of pulses through collecting information of a three-phase current, comprising:
   a three-phase AC motor for generating a three-phase current;
   a pulse-width modulator, coupled to the three-phase AC motor, for modulating the three-phase current to generate an original voltage space vector;
   a detecting device for detecting voltage composition of the original voltage space vector;
   a detecting vector generator for offering three detecting vectors with a sum of zero according to the detecting result;
   a control chip, coupled to the pulse-width modulator, for adding the three detecting vectors with a sum of zero after the original voltage space vector; and
   an A/D converter, coupled to the control chip, for sampling a current to generate a sampling result while adding the three detecting vectors;
   wherein the control chip adjusts the width of pulses generated by the pulse width modulator according to the sampling result.

7. The pulse-width modulation system of claim 6 wherein adding the three detecting vectors with a sum of zero after the original voltage space vector orderly is performed by adding the three detecting vectors with a sum of zero after the original voltage space vector orderly through the pulse width modulator.

8. The pulse-width modulation system of claim 6 wherein a length of each detecting vector is not shorter than a sum of a period for a transistor from being switched-on to a steady state, a transition period for an operational amplifier transiting from a low voltage to a high voltage, and a sampling period of an A/D converter.

9. A method for adjusting a width of pulses through collecting information of a three-phase current, comprising:
   an AC motor generating the three-phase current;
   modulating the three-phase current to generate a first sequence of voltage space vectors through a pulse-width modulator, the first sequence of voltage space vectors comprising a plurality of first voltage space vectors;
   detecting each first voltage space vector in the first sequence of voltage space vectors to generate a first detecting result;
   detecting voltage composition of a sum of the plurality of first voltage space vectors to generate a second detecting result;
   replacing different zero voltage space vectors in the first sequence of voltage space vectors with a same zero voltage space vector chosen from the first sequence of voltage space vectors to generate a second sequence of voltage space vectors according to the first detecting result, the second sequence of voltage space vectors comprising a plurality of second voltage space vectors;
   re-arranging orders of the second voltage space vectors in the second sequence of voltage space vectors to generate a third sequence of voltage space vectors;
   offering three detecting vectors with a sum of zero according to the second detecting result;
   adding the three detecting vectors with a sum of zero after the third sequence of voltage space vectors orderly;
   sampling a current to generate a sampling result while adding the three detecting vectors; and
   adjusting the width of pulses generated by the pulse width modulator according to the sampling result.

10. The method of claim 9 wherein adding the three detecting vectors with a sum of zero after the third sequence of voltage space vectors orderly is performed by adding the three detecting vectors with a sum of zero after the third sequence of voltage space vectors orderly through the pulse width modulator.

11. The method of claim 9 wherein detecting the voltage composition of a sum of the plurality of first voltage space vectors to generate a second detecting result is detecting whether two phase voltages in the plurality of first voltage space vectors are positive values.

12. The method of claim 9 wherein detecting the voltage composition of a sum of the plurality of first voltage space vectors to generate a second detecting result is detecting whether two phase voltages in the plurality of first voltage space vectors are negative values.

13. The method of claim 9 wherein a length of each detecting vector is not shorter than a sum of a period for a transistor from being switched-on to a steady state, a transition period for an operational amplifier transiting from a low voltage to a high voltage, and a sampling period of an A/D converter.

14. A pulse-width modulation system adjusting a width of pulses through collecting information of a three-phase current, comprising:
- a three-phase AC motor for generating a three-phase current;
- a pulse-width modulator, coupled to the three-phase AC motor, for modulating the three-phase current to generate a first sequence of voltage space vectors, the first sequence of voltage space vectors comprising a plurality of first voltage space vectors;
- a detecting device for detecting each first voltage space vector in the first sequence of voltage space vectors to generate a first detecting result, and detecting voltage composition of a sum of the plurality of first voltage space vectors to generate a second detecting result;
- a replacing device for replacing different zero voltage space vectors in the first sequence of voltage space vectors with a same zero voltage space vector chosen from the first sequence of voltage space vectors to generate a second sequence of voltage space vectors according to the first detecting result, the second sequence of voltage space vectors comprising a plurality of second voltage space vectors;
- a re-arranging device for re-arranging orders of the second voltage space vectors in the second sequence of voltage space vectors to generate a third sequence of voltage space vectors;
- a detecting vector generator for offering three detecting vectors with a sum of zero according to the second detecting result;
- a control chip, coupled to the pulse-width modulator, for adding the three detecting vectors with a sum of zero after the third sequence of voltage space vectors; and
- an A/D converter, coupled to the control chip, for sampling a current to generate a sampling result while adding the three detecting vectors;
- wherein the control chip adjusts the width of pulses generated by the pulse width modulator according to the sampling result.

15. The method of claim 14 wherein adding the three detecting vectors with a sum of zero after the third sequence of voltage space vectors orderly is performed by adding the three detecting vectors with a sum of zero after the third sequence of voltage space vectors orderly through the pulse width modulator.

16. The method of claim 14 wherein a length of each detecting vector is not shorter than a sum of a period for a transistor from being switched-on to a steady state, a transition period for an operational amplifier transiting from a low voltage to a high voltage, and a sampling period of an A/D converter.

* * * * *